United States Patent

Kuhlthau et al.

[11] 4,051,084
[45] Sept. 27, 1977

[54] CATIONIC DYESTUFFS

[75] Inventors: Hans-Peter Kuhlthau, Leverkusen; Hermann Beecken, Schildgen, both of Germany

[73] Assignee: Bayer Aktiengesellschaft, Leverkusen, Germany

[21] Appl. No.: 539,778

[22] Filed: Jan. 9, 1975

[30] Foreign Application Priority Data

Jan. 11, 1974 Germany .............. 2401246

[51] Int. Cl.² .............. C09B 29/36; C09B 29/22; D06P 3/76
[52] U.S. Cl. ............. 260/158; 8/41 C; 8/168 R
[58] Field of Search ............ 260/158

[56] References Cited

U.S. PATENT DOCUMENTS

| | | | |
|---|---|---|---|
| 3,478,011 | 11/1969 | Ariz | 260/205 |
| 3,573,273 | 3/1971 | Seedfelder et al. | 260/158 |
| 3,578,386 | 5/1971 | Kalopissis et al. | 260/158 X |
| 3,592,807 | 7/1971 | Brachel et al. | 260/207.1 |
| 3,595,852 | 7/1971 | Hahn et al. | 260/158 |
| 3,687,929 | 8/1972 | Ramanathan et al. | 260/156 |
| 3,712,881 | 1/1973 | Angliker et al. | 260/158 |
| 3,759,894 | 9/1973 | Angliker et al. | 260/158 |
| 3,860,572 | 1/1975 | Peter et al. | 260/207 |
| 3,874,847 | 4/1975 | Ohkawa et al. | 260/158 X |

FOREIGN PATENT DOCUMENTS 43-4213   2/1968   Japan .............. 260/158

*Primary Examiner*—Daniel E. Wyman
*Assistant Examiner*—John J. Doll
*Attorney, Agent, or Firm*—Plumley and Tyner

[57] ABSTRACT

Cationic dyestuffs of the formula

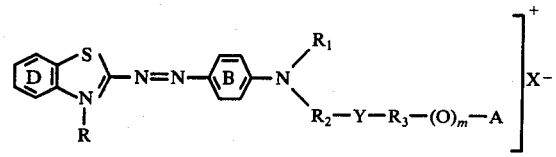

wherein
R represents alkyl, alkenyl, cycloalkyl or aralkyl,
$R_1$ represents hydrogen, alkyl, alkenyl, cycloalkyl or aralkyl,
$R_2$ represents alkylene,
Y represents oxygen or sulphur,
$R_3$ represents a direct bond or -CO-,
A represents a carbocyclic six-membered ring or a heterocyclic ring,
$X^-$ represents an anion and
$m$ represents the numbers 0 or 1, with the proviso that $m$ can only be 1 if $R_3$ denotes an alkylene group, are suitable for dyeing and printing of natural and synthetic materials.

7 Claims, No Drawings

CATIONIC DYESTUFFS

The invention relates to new cationic dyestuffs of the general formula

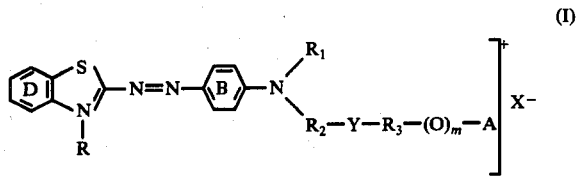

(I)

wherein
R represents an alkyl, alkenyl, cycloalkyl or aralkyl radical,
$R_1$ represents hydrogen or an alkyl, alkenyl, cycloalkyl or aralkyl radical,
$R_2$ represents an alkylene group,
Y represents oxygen or sulphur,
$R_3$ represents a direct bond, an alkylene group or the group of atoms —CO—,
A represents a saturated or unsaturated carbocyclic six-membered ring or a heterocyclic ring which can contain a quaternary nitrogen atom of the form

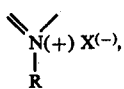

$X^-$ represents an anion and
m represents the numbers 0 or 1,
with the proviso that m can only be 1 if $R_3$ denotes an alkylene group, and wherein the cyclic and acyclic radicals can contain non-ionic substituents, and wherein other, optionally non-ionically substituted, carbocyclic or heterocyclic rings can be fused to the rings A, B and D, as well as mixtures of such dyestuffs, processes for the preparation of these dyestuffs, their use for dyeing, printing and bulk dyeing of natural and synthetic materials, and the materials dyed and printed with these dyestuffs.

As examples of the radicals mentioned in the definitions of R and $R_1$ there may be mentioned: as alkyl radicals, above all $C_1$–$C_6$-alkyl radicals or $C_1$–$C_6$-alkyl radicals substituted by the carboxyl group or by non-ionic substituents, such as halogen atoms, or hydroxyl, $C_1$–$C_4$-alkoxy, nitrile, $C_1$–$C_4$-alkoxycarbonyl or carbonamide groups, for example the trifluoromethyl, chloroethyl, bromoethyl, hydroxyethyl, methoxyethyl, cyanoethyl, acetoxyethyl, aminocarbonylethyl, carboxyethyl, γ-cyanopropyl, β-hydroxy-n-propyl, β-hydroxy-n-butyl β-hydroxy-i-butyl, β-hydroxy-γ-allyloxy-n-propyl, γ-methoxycarbonyl-n-butyl-, phenylsulphonylaminoethyl, $C_1$–$C_6$-alkyl-sulphonylaminoethyl, N-(phenylsulphonyl)-N-($C_1$–$C_6$-alkyl)-aminoethyl or N-($C_1$–$C_6$-alkylsulphonyl)-N-($C_1$–$C_6$-alkyl)-aminoethyl radical; as alkenyl radicals, above all $C_2$–$C_6$-alkenyl radicals, such as the vinyl, allyl, methallyl and 2-chloroallyl radical; as cycloalkyl radicals, above all the cyclopentyl and cyclohexyl radical and their derivatives substituted by non-ionic substituents, such as halogen atoms or $C_1$–$C_6$-alkyl groups, such as the 4-chlorocyclohexyl and the dimethylcyclohexyl radical; as aralkyl radicals, above all the benzyl, 2-phenylethyl, β-phenyl-β-hydroxyethyl and 2-phenylpropyl-(2) radical and their derivatives substituted in the phenyl nucleus by non-ionic radicals, such as halogen or $C_1$–$C_4$-alkyl, such as the 4-chlorobenzyl or 3-methylbenzyl radical.

As examples of $R_2$, there may be mentioned unbranched or branched $C_1$–$C_6$-alkylene radicals, which can be substituted, such as phenoxymethylethylene, $C_1$–$C_4$-alkyloxymethylethylene or phenylethylene. As examples of $R_3$, there may be mentioned unbranched or branched $C_1$–$C_6$-alkylene radicals.

Preferred carbocyclic rings A are radicals of the benzene, cyclohexane, menthane, naphthalene, tetrahydronaphthalene and decahydronaphthalene series.

Preferred heterocyclic rings A are radicals of the benzthiazole, benzoxazole, thiazole or triazole series, bonded via a C atom. Examples of radicals with quaternary nitrogen are the N-methylated derivatives of these heterocyclic structures.

The ring B can have, for example, a benzene or tetrahydrobenzene ring fused to it, and the ring D can have, for example, a benzene or tetrahydrobenzene ring fused to it in the 4,5-, 5,6- or 6,7-position.

Halogen is preferably understood as fluorine, chlorine or bromine.

By non-ionic substituents there are . . . in the sense of the present invention the substituents which are customary in dyestuff chemistry and do not dissociate under the reaction conditions in question, such as halogen, for example fluorine, chlorine or bromine; nitro, nitrile, formyl, ureido, aminocarbonyl and aminosulphonyl; the following radicals, containing alkyl groups, in which the alkyl groups mentioned preferably have 1–4 C atoms: alkoxy, alkylthio, alkoxycarbonyl, alkylcarbonyl, alkylcarbonyloxy, alkoxycarbonyloxy, alkylcarbonylamino, alkylaminocarbonyloxy, alkylsulphonylamino, alkylureido, alkoxycarbonylamino, alkylaminocarbonyl, dialkylaminocarbonyl, N-alkyl-N-aryl-aminocarbonyl, wherein the aryl group preferably represents a phenyl group, alkylaminosulphonyl, dialkylaminosulphonyl, alkylsulphonyl, alkoxysulphonyl or alkylsulphonyl-alkylamino; further, aryl and radicals containing aryl groups, in which the aryl radical preferably denotes phenyl or naphthyl, namely: aryloxy, aryloxyalkoxy, arylthio, arylcarbonyl, arylcarbonyloxy, arylcarbonylamino, arylaminocarbonyloxy, arylsulphonylamino, arylsulphonylalkylamino, arylureido, aryloxycarbonylamino, arylsulphonyl, aryloxycarbonyl or aryloxysulphonyl; radicals containing aralkyl groups, in which the aralkyl groups preferably denote benzyl or phenylethyl, namely: aralkoxy, aralkylthio, aralkylcarbonyl, aralkylsulphonyl or aralkyloxycarbonyl; and also cycloalkyl or radicals containing cycloalkyl groups, in which the cycloalkyl group preferably represents a cyclopentyl or cyclohexyl radical, such as cycloalkoxy. Further possible non-ionic substituents which are bonded to a cyclic radical are alkyl with, preferably, 1–12 C atoms or aralkyl having the above-mentioned preferred definition.

Possible anionic radicals $X^-$ are the organic and inorganic anions customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and meta-phosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoroborate as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, the ether-propionic acid of the alcohol mixture with 6 to 10 carbon atoms, thioacetic acid, 6-benzoylamino-2-chlorocaproic acid, nonylphenol-tetraethylene glycol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acid with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-$\alpha,\alpha'$-dicarboxylic acid, methylene-bis-thioglycollic acid, dimethyl sulphide-$\alpha,\alpha'$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$–$C_{15}$ paraffinsulphonic acids obtained by hydrolysis of the sulphochlorination products of the corresponding n-paraffins.

Examples of suitable anions of cycloaliphatic carboxylic acids are the anions of cyclohexanecarboxylic acid and cyclohexane-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do no influence it adversely are frequently also preferred.

The anion is in general decided by the production process and by the purification of the crude dyestuff which may be carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner.

Preferred dyestuffs correspond to the general formula

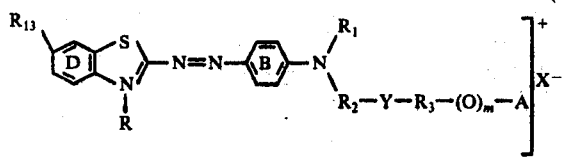

in which

R, $R_1$, $R_2$, Y, $R_3$, A, m and $X^{31}$ have the meaning indicated for formula (I) and $R_{13}$ represents hydrogen, alkyl, cycloalkyl, aralkyl, alkoxy, aryloxy, aralkoxy, acylamino or halogen and wherein the cyclic and acyclic radicals can contain non-ionic substituents and further optionally non-ionically substituted carbocyclic or heterocyclic rings can be fused to the rings A, B and D.

Dyestuffs of particular importance are those of the general formula

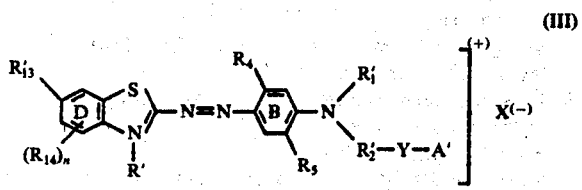

wherein

R' represents an optionally halogen-, hydroxy-, nitrile-, acetoxy-, $C_1$-$C_4$-alkoxycarbonyl-, hydroxycarbonyl- or aminocarbonyl-substituted $C_1$-$C_6$-alkyl, $C_2$-$C_7$-alkenyl, benzyl, phenylethyl or the radical

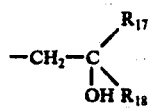

wherein $R_{17}$ denotes hydrogen or methyl and $R_{18}$ denotes methyl, ethyl, chloromethyl, methoxymethyl, ethoxymethyl, propoxymethyl, butoxymethyl, allyloxymethyl, phenoxymethyl or phenyl, $R_1'$ represents $C_1$-$C_6$-alkyl which is optionally substituted by halogen, hydroxyl, $C_1$-$C_4$-alkoxy, phenoxy, nitrile, acetoxy, hydroxycarbonyl, $C_1$-$C_4$-alkoxycarbonyl, $C_1$-$C_4$-alkoxycarbonyloxy, aminocarbonyl, $C_1$-$C_4$-alkylsulphonylamino, or $C_1$-$C_4$-alkylsulphonyl-$C_1$-$C_4$-alkylamino; $C_2$-$C_7$-alkenyl; or optionally $C_1$-$C_6$-alkyl-substituted cyclopentyl, cyclohexyl, benzyl or β-phenylethyl, $R_2$ represents

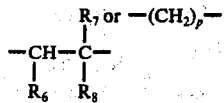

wherein $R_6$ denotes hydrogen, methyl, ethyl, methoxymethyl, ethoxymethyl, propoxymethyl, butoxymethyl, allyloxymethyl, phenyl or phenoxymethyl, $R_7$ denotes hydrogen, methyl, ethyl, butoxymethyl, methoxymethyl, ethoxymethyl, propoxymethyl, allyloxymethyl, phenyl, phenoxymethyl or —Y—A, $R_8$ denotes hydrogen or methyl and p denotes the numbers from 1 to 6, Y represents oxygen or sulphur, $R_4$ represents hydrogen, halogen, optionally halogen-substituted $C_1$-$C_6$-alkyl, $C_1$-$C_4$-alkoxy, benzyloxy or β-phenylethyloxy which are optionally substituted in the phenyl ring by $C_1$-$C_6$-alkyl, nitrile, phenyloxy or naphthyloxy which are optionally substituted by $C_1$-$C_6$-alkyl or halogen, $C_1$-$C_4$-alkylcarbonylamino or -sulphonylamino, phenylcarbonylamino or -sulphonylamino, $C_1$-$C_4$-alkylcarbonyloxy or phenylcarbonyloxy, or together with B represent a naphthalene or tetralin ring, $R_5$ represents hydrogen, $C_1$-$C_6$-alkyl, $C_1$-$C_4$-alkoxy, benzyloxy or β-phenylethyloxy which are optionally substituted in the phenyl ring by $C_1$-$C_6$-alkyl, phenyloxy or naphthyloxy which are optionally substituted by $C_1$-$C_6$-alkyl or halogen, $C_1$-$C_4$-alkylcarbonylamino or -sulphonylamino, phenylcarbonylamino, or -sulphonylamino, $C_1$-$C_4$-alkylcarbonyloxy or phenylcarbonyloxy, or together with B represent a naphthalene or tetralin ring, $R_{13}'$ represents hydrogen, $C_1$-$C_6$-alkyl, $C_1$-$C_4$-alkoxy; cyclopentyl, cyclohexyl, benzyl or β-phenylethyl which are optionally substituted by $C_1$-$C_6$-alkyl; phenyloxy or naphthyloxy which are optionally substituted by $C_1$-$C_6$-alkyl or halogen; benzyloxy; β-phenylethyl; $C_1$-$C_4$-alkylcarbonylamino or -sulphonylamino, phenylcarbonylamino or -sulphonylamino; or a benzene or tetrahydrobenzene ring which is fused in the 4,5- or 5,6-position of D;

$R_{14}$ represents $C_1$-$C_6$-alkyl, $C_1$-$C_4$-alkoxy, phenoxy, benzyloxy, benzyl, trifluoromethyl, halogen, $C_1$-$C_4$-alkylcarbonylamino or -sulphonylamino, phenylcarbonylamino or -sulphonylamino or a benzene or tetrahydrobenzene ring which is fused in the 6,7-position of D, A' represents a radical of the benzene, cyclohexane, menthane, naphthalene, tetrahydronaphthalene and decahydronaphthalene, benzthiazole, benzoxazole, thiazole or triazole series, which is bonded to Y via a C atom, n represents the numbers 0, 1, 2 or 3 and $X^{(-)}$ represents an anion.

Dyestuffs to be singled out amongst those of the formula III are those in which $R_{13}'$ represents an alkoxy group with 1–4 C atoms and $R_{14}$ represents methyl, ethyl, methoxy, ethoxy, chlorine, bromine, fluorine, trifluoromethyl, phenoxy or benzyloxy.

Amongst these examples, the dyestuffs of the greatest interest are those in which $R_{13}'$ represents a methoxy or ethoxy group, R' represents methyl or ethyl, $R_5$ represents hydrogen, $R_4$ represents hydrogen, methoxy, chlorine or methyl, p represents the number 2, n represents the number 0, Y represents oxygen and A' represents cyclohexyl or an optionally substituted phenyl or naphthyl radical.

Further dyestuffs of particular importance are those of the general formula $$\begin{bmatrix} R_{13}\!-\!\underset{(R_{14})_n}{\overset{S}{\underset{N}{\bigcirc_D}}}\!\!-\!\!N\!=\!N\!-\!\underset{R_5}{\overset{R_4}{\bigcirc_B}}\!-\!N\!\overset{R_1'}{\underset{R_2''\!-\!O\!-\!(CH_2)_q\!-\!(O)_m\!-\!A'}{}} \end{bmatrix}^+ X^- \quad (IV)$$

wherein

R', $R_1'$, $R_4$, $R_5$, $R_{13}'$, $R_{14}$, A', n, m and $X^-$ have the same meaning as in the formula III and wherein $R_2''$ represents $$-\underset{R_6}{\overset{R_9}{\underset{|}{CH}}}-\underset{R_8}{\overset{|}{\underset{|}{C}}}-\quad\text{or}\quad-(CH_2)_p-\quad\text{and}$$

q represents the numbers from 1 to 4.

$R_6$, $R_8$ and p denote the same as in the formula III and $R_9$ represents hydrogen, methyl, ethyl, methoxymethyl, ethoxymethyl, propoxymethyl, butoxymethyl, allyloxymethyl, phenyl, phenoxymethyl, or $-O-(CH_2)_q-(O)_m-A$.

Amongst the dyestuffs of the general formula IV, those to be singled out are those in which $R_{13}'$ represents an alkoxy group with 1–4 C atoms and $R_{14}$ represents methyl, ethyl, methoxy, ethoxy, chlorine, bromine, fluorine, trifluoromethyl, phenoxy or benzyloxy.

Amongst these examples, the dyestuffs of the greatest interest are those in which $R_{13}'$ represents a methoxy or ethoxy group, R' represents methyl or ethyl, $R_5$ represents hydrogen, $R_4$ represents hydrogen, methoxy, chlorine or methyl, q represents the numbers from 1 to 3, n represents the number 0, p represents the number 2, m represents the number 0 and A' represents an optionally non-ionically substituted phenyl ring or naphthyl radical.

In dyestuffs of comparable interest m represents the number 1 and at the same time q represents the number 2.

Further dyestuffs of particular interest are those of the general formula $$\begin{bmatrix} R_{13}\!-\!\underset{(R_{14})_n}{\overset{S}{\underset{N}{\bigcirc_D}}}\!\!-\!\!N\!=\!N\!-\!\underset{R_5}{\overset{R_4}{\bigcirc_B}}\!-\!N\!\overset{R_1'}{\underset{R_2'''\!-\!O\!-\!CO\!-\!A'}{}} \end{bmatrix}^+ X^- \quad (V)$$

wherein

R', $R_1$, $R_4$, $R_5$, $R_{13}'$, $R_{14}$, A', n and $X^-$ have the same meaning as in the formula III and wherein $R_2'''$ represents $$-\underset{R_6}{\overset{R_{10}}{\underset{|}{CH}}}-\underset{R_8}{\overset{|}{\underset{|}{C}}}-\quad\text{or}\quad-(CH_2)_p-.$$

$R_6$, $R_8$ and p have the same meaning as in the formula III and $R_{10}$ represents hydrogen, methyl, ethyl, methoxymethyl, ethoxymethyl, propoxymethyl, butoxymethyl, allyloxymethyl, phenyl, phenoxymethyl or chloromethyl.

Amongst the dyestuffs of the formula V, those to be singled out are those in which $R_{13}'$ represents an alkoxy group with 1–4 C atoms and $R_{14}$ represents methyl, ethyl, methoxy, ethoxy, chlorine, bromine, fluorine, trifluoromethyl, phenoxy or benzyloxy.

Amongst these examples, the dyestuffs of the greatest interest are those in which $R_{13}'$ represents a methoxy or ethoxy group, R' represents methyl or ethyl, $R_5$ represents hydrogen, $R_4$ represents hydrogen, methoxy, chlorine or methyl, p represents the number 2, n represents the number 0 and A' represents an optionally non-ionically substituted phenyl ring or naphthyl radical.

Dyestuffs of the formula I are produced in a manner which is in itself known by the action of quaternising agents of the general formula $$R - X \quad (VII)$$

on azo dyestuffs of the general formula $$\underset{D}{\overset{S}{\bigcirc}}\!\!-\!\!N\!=\!N\!-\!\underset{B}{\bigcirc}\!-\!N\!\overset{R_1}{\underset{R_2-Y-R_3-(O)_m-A}{}} \quad (VIII)$$

In these formulae

X denotes a radical which can be split off as an anion and $R_1$, $R_2$, $R_3$, Y, A and m have the meaning indicated for formula I.

The cyclic and acyclic radicals can have non-ionic substituents and optionally non-ionically substituted carbocyclic or heterocyclic rings can be fused to the rings A, B and D.

Examples of suitable quaternising compounds are alkyl halides, alkenyl halides, aralkyl halides, cycloalkyl halides, dialkyl sulphates, alkyl esters of arylsulphonic acids and other esters of strong mineral acids and organic sulphonic acids with preferably lower alcohols. The quaternising agents can be substituted further, examples being bromopropionic acid amide and bromopropionitrile.

The action of these compounds can take place without or with addition of a further solvent or in aqueous suspension at temperatures of 5°–100° C, preferably 15°–90° C. The presence of a basic material such as magnesium oxide, alkali metal carbonate, alkaline earth metal carbonate, potassium acetate, sodium bicarbonate or mixtures of such basic materials may be indicated.

Examples of suitable solvents are halogenobenzenes, benzene hydrocarbons, dialkyl ketones, halogenoalkanes (such as carbon tetrachloride, tetrachloroethylene and chloroform), nitrobenzene, dimethylformamide, acetonitrile, glacial acetic acid, formic acid or alcohols.

The alkylation of azo dyestuffs of the formula VIII to give basic dyestuffs of the formula I can also be carried out by treatment with acrylic acid or its derivatives, for example acrylamide, in the presence of an organic or inorganic acid such as acetic acid, formic acid, hydrochloric acid or their mixtures, at temperatures between 50° and 100° C. The quaternisation can also be carried out by treatment with ethylene oxide or an epoxy compound of the formula

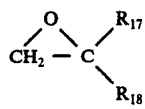   (IX)

wherein
$R_{17}$ and $R_{18}$ have the meaning indicated for formula III.

This reaction is carried out using a solvent, in the presence of an organic or inorganic acid which provides the anion $X^-$, at temperatures of 10°-100° C, preferably at 40°-90° C. Examples of suitable acids are sulphuric acid, phosphoric acid, hydrochloric acid, hydrogen bromide, benzenesulphonic acid, toluenesulphonic acid, formic acid, acetic acid or propionic acid, and the liquid fatty acids can at the same time be used as solvents. Further examples of suitable solvents are dimethylformamide, acetonitrile, dioxane, tetrahydrofurane, halogenobenzene, benzene hydrocarbons, nitrobenzene, dialkyl ketones and the like.

The compounds of the formula VIII, which are in part known, are obtained when 2-aminobenzthiazoles of the formula

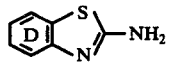   (X)

wherein
the ring D can have non-ionic substituents and/or can be fused to one or more further rings
are diazotised and then coupled to anilines of the formula

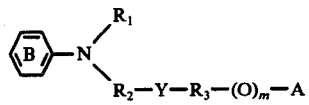   (XI)

In these formulae
$R_1$, $R_2$, $R_3$, Y, m and A have the meaning indicated for formula I.
The cyclic and acyclic radicals can have non-ionic substituents, and further rings can be fused to the rings A and B.

Dyestuffs of the formula I can also be produced by oxidative coupling of hydrazones of the formula

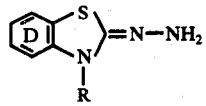   (XII)

wherein
R has the meaning indicated for formula I and the ring D and R can have non-ionic substituents and further rings can be fused to the ring D,
to anilines of the formula XI.

Examples of suitable benzthiazoles of the formula X are: 2-amino-6-methoxy-benzthiazole, 2-amino-6-ethoxy-benzthiazole, 2-amino-6-methoxy-4-methyl-benzthiazole, 2-amino-5,6-dimethoxy-benzthiazole, 2-amino-4,6-dimethoxy-benzthiazole, 2-amino-5-methyl-6-methoxy-benzthiazole, 2-amino-6-(α-ethyl-capronylamino)-benzthiazole, 2-amino-benzthiazole, 2-amino-6-benzoylamino-benzthiazole, 2-amino-6-acetylamino-benzthiazole, 2-amino-6-butyloxy-benzthiazole, 2-amino-6-propoxy-benzthiazole and 2-amino-6-methyl-benzthiazole.

Examples of suitable anilines of the formula XI are: N-β-cyclohexyloxy-ethyl-N-ethylaniline, N-β-benzoyloxy-ethyl-N-ethylaniline, N-β-(p-methoxybenzoyloxy)-ethyl-N-ethylaniline, N-β-(p-methoxy-carbonylbenzoyloxy)-ethyl-N-ethylaniline, N-β-phenoxy-ethyl-N-ethylaniline, N-β-benzyloxy-ethyl-N-ethylaniline, N-β-(β'-phenylethyloxy)-ethyl-N-ethylaniline, N-β-(γ'-phenylpropyloxy)-ethyl-N-ethylaniline, N-β-(β'-phenyloxyethyloxy)-ethyl-N-ethylaniline, N-β-(p-chlorophenoxy)-ethyl)-N-ethylaniline, N-β-(p-chlorobenzyloxy)-ethyl-N-ethylaniline, N-β-(o-chlorophenoxy)-ethyl-N-ethylaniline, N-β-(p-methyl-phenoxy)-ethyl-N-ethylaniline, N-β-(o-methylphenoxy)-ethyl-N-ethylaniline, N-β-(p-ethylphenoxy)-ethyl-N-ethylaniline, N-β-(o-ethylphenoxy)-ethyl-N-ethylaniline, N-β-(m-methylphenoxy)-ethyl-N-ethylaniline, N-β-(p-cyclohexylphenoxy)-ethyl-N-ethylaniline, N-β-(β'-naphthoxy)-ethyl-N-ethylaniline, N-β-(o-isopropyloxyphenoxy)-ethyl-N-ethylaniline, N-β-(o,p-dichlorophenoxy)-ethyl-N-ethylaniline, N-β-(p-phenylphenoxy)-ethyl-N-ethylaniline, N-β-(o-benzylphenoxy)-ethyl-N-ethylaniline, N-β-(p-benzylphenoxy)-ethyl-N-ethylaniline, N-β-(p-tert.-butylphenoxy)-ethyl-N-ethylaniline, N-β-phenylthio-ethyl-N-ethylaniline, N-β-(p-methoxy-phenoxy)-ethyl-N-ethylaniline, N-β-(o-isopropylphenoxy)-ethyl-N-ethylaniline, N-β-(1,2,3,4-tetrahydronaphth-(6)-oxy)-ethyl-N-ethylaniline, N-β-(1,2,3,4-tetrahydronaphth-(1)-oxy)-ethyl-N-ethylaniline, N-γ-phenoxypropyl-N-ethylaniline, N-δ-phenoxybutyl-N-ethylaniline, N-β-(p-tert.-butylphenylthio)-ethyl-N-ethylaniline, N-β-pentachlorophenylthio-ethyl-N-ethylaniline, N-β-(3,5-dimethylphenoxy)-ethyl-N-ethylaniline, N-β-(3,5-dimethyl-4-chlorophenoxy)-ethyl-N-ethylaniline, N-β-[p-(2-phenylisopropyl)-phenoxy]-ethyl-N-ethylaniline, N-β-(m-chlorophenoxy)-ethyl-N-ethylaniline, N-β-(2,5-dichlorophenoxy)-ethyl-N-ethylaniline, N-β-(2,4,5-trichlorophenoxy)-ethyl-N-ethylaniline, N-β-(2,6-dichlorophenoxy)-ethyl-N-ethylaniline, N-β-(2,4,6-trichlorophenoxy)-ethyl-N-ethylaniline, N-β-(pentachlorophenoxy)-ethyl-N-ethylaniline, N-β-(p-chlorophenylthio)-ethyl-N-ethylaniline, N-β-(2-chloro-6-methylphenoxy)-ethyl-N-ethylaniline, N-β-(2-methyl-5-chlorophenoxy)-ethyl-N-ethylaniline, N-β-(2-methyl-4-chlorophenoxy)-ethyl-N-ethylaniline, N-β-(2-methyl-3- chlorophenoxy)-ethyl-N-ethylaniline, N-β-(2-chloro-5-methylphenoxy)-ethyl-N-ethylaniline, N-β-(3-methyl-4-chlorophenoxy)-ethyl-N-ethylaniline, N-β-(2,4,6-trichloro-3-methylphenoxy)-ethyl-N-ethylaniline, N-β-(p-methylphenylthio)-ethyl-N-ethylaniline, N-β-(2,3-dimethylphenoxy)-ethyl-N-ethylaniline, N-β-(3,4-dimethylphenoxy)-ethyl-N-ethylaniline, N-β-(2,6-dimethylphenoxy)-ethyl-N-ethylaniline, N-β-(2,4-dimethylphenoxy)-ethyl-N-ethylaniline, N-β-(2,5-dimethylphenoxy)-ethyl-N-ethylaniline, N-β-(3-methyl-5-ethylphenoxy)-ethyl-N-ethylaniline, N-β-(2,3,5-trimethylphenoxy)-ethyl-N-ethylaniline, N-β-(o-sec.-butylphenoxy)-ethyl-N-ethylaniline, N-β-(2-isopropyl-5-methylphenoxy)-ethyl-N-ethylaniline, N-β-(3-methyl-5-isopropylphenoxy)-ethyl-N-ethylaniline, N-β-[p-(1,1,3,3-tetramethylbutyl)-phenoxy]-ethyl-N-ethylaniline, N-β-nonylphenoxyethyl-N-ethylaniline, N-β-dodecylphenoxyethyl-N-ethylaniline, N-β-(2,6-diisopropylphenoxy)-ethyl-N-ethylaniline, N-β-(2-cyclohexylphenoxy)-ethyl-N-ethylaniline, N-β-(α'-naphthoxy)-ethyl-N-ethylaniline, N-β-(o-phenylphenoxy)-ethyl-N-ethylaniline, N-β-(m-phenylphenoxy)-ethyl-N-ethylaniline, N-β-(o-ethoxy-phenoxy)-ethyl-N-ethylaniline, N-β-(m-methoxy-phenoxy)-ethyl-N-ethylaniline, N-β-(p-phenylsulphonylphenoxy)-ethyl-N-ethylaniline, N-β-(3-methyl-4-methylthiophenoxy)-ethyl-N-ethylaniline, N-β-(p-methylcyclohexyloxy)-ethyl-N-ethylaniline, N-β-(o-methylcyclohexyloxy)-ethyl-N-ethylaniline, N-β-(m-methylcyclohexyloxy)-ethyl-N-ethylaniline, N-β-(decahydronaphth-(2)-oxy)-ethyl-N-ethylaniline, N-β-menthyl-ethyl-N-ethylaniline, N-β-borneyl-ethyl-N-ethylaniline, N-β-(o-chlorobenzyloxy)-ethyl-N-ethylaniline, N-β-(p-methylbenzyloxy)-ethyl-N-ethylaniline, N-β-(p-methoxybenzyloxy)-ethyl-N-ethylaniline, N-β-(o-methylbenzyloxy)-ethyl-N-ethylaniline, N-β-(m-chlorobenzyloxy)-ethyl-N-ethylaniline, N-β-(m-methylbenzyloxy)-ethyl-N-ethylaniline, N-β-(p-chlorobenzoyloxy)-ethyl-N-ethylaniline, N-β-(p-methylbenzoyloxy)-ethyl-N-ethylaniline, N-β-(chlorobenzoyloxy)-ethyl-N-ethylaniline, N-β-(3,4-dichlorobenzoyloxy)-ethyl-N-ethylaniline, N-β-(2-methylbenzoyloxy)-ethyl-N-ethylaniline, N-β-(p-methoxybenzoyloxy)-ethyl-N-ethylaniline, N-β-(m-chlorobenzoyloxy)-ethyl-N-ethylaniline, N-β-(2,5-dichlorobenzoyloxy)-ethyl-N-ethylaniline, N-β-(2,4-dichlorobenzoyloxy)-ethyl-N-ethylaniline, N-β-(2-bromobenzoyloxy)-ethyl-N-ethylaniline, N-β-(m-methylbenzoyloxy)-ethyl-N-ethylaniline, N-β-(p-tert.-butylbenzoyloxy)-ethyl-N-ethylaniline, N-β-(naphth(2-)oyloxy)-ethyl-N-ethylaniline, N-β-(naphth(1)oyloxy)-ethyl-N-ethylaniline, N-β-(p-phenylbenzoyloxy)-ethyl-N-ethylaniline, N-β-(2-methoxybenzoyloxy)-ethyl-N-ethylaniline, N-β-(3-methoxybenzoyloxy)-ethyl-N-ethylaniline, N-β-(p-methoxycarbonylphenoxy)-ethyl-N-ethylaniline, N-β-(p-ethylthio-o-chlorobenzoyloxy)-ethyl-N-ethylaniline, N-β-(2,6-dichlorobenzyloxy)-ethyl-N-ethylaniline, N-β-(3,4-dichlorobenzyloxy)-ethyl-N-ethylaniline, N-β-(1,2,3,4-tetrahydronaphth-(6)-oxymethoxy)-ethyl-N-ethylaniline, N-β-(benzthiazol-(2)-ylthio)-ethyl-N-ethylaniline, N-β-(phenoxy)-n-butyl-ethylaniline, N-(1-phenoxy)-sec.-butyl-N-ethylaniline, N-β-benzyloxy-n-butyl-N-ethylaniline, N-(1-benzyloxy)-sec.-butyl-N-ethylaniline, N-β-benzoyloxy-n-butyl-N-ethylaniline, N-(1-benzoyloxy)-sec.-butyl-N-ethylaniline, N-β-phenoxy-n-propyl-N-ethylaniline, N-1-phenoxy-i-propyl-N-ethylaniline N-β-benzyloxy-n-propyl-N-ethylaniline, N-1-benzyloxy-i-propyl-N-ethylaniline, N-β-benzoyloxy-n-propyl-N-ethylaniline, N-1-benzoyloxy-i-propyl-N-ethylaniline, N,N-bis-(β-phenoxyethyl)-aniline, N,N-bis-(β-benzyloxyethyl)-aniline N,N-bis-(β-benzyloxyethyl)-aniline, N-(β-benzoyloxy-γ-chloro)-propyl-N-ethylaniline, N-cyclohexyl-N-β-phenoxyethylaniline, N-benzyl-N-β-phenoxyethylaniline, N-n-propyl-N-β-phenoxyethylaniline, N-n-propyl-N-β-benzyloxyethylaniline, N-n-propyl-N-β-benzoyloxyethylaniline, N-benzyl-N-β-benzyloxyethylaniline, N-benzyl-N-β-benzoyloxyethylaniline, N-β-chloroethyl-N-β-phenoxyethylaniline, N-β-hydroxyethyl-N-β-phenoxyethylaniline, N-β-cyanoethyl-N-β-phenoxyethylaniline, N-β-acetoxyethyl-N-β-phenoxyethylaniline, N-β-methoxyethyl-N-β-phenoxyethylaniline, N-β-butoxyethyl-N-β-phenoxyethylaniline, N-β-hydroxy-n-butyl-N-β-phenoxyethylaniline, N-β-hydroxy-n-propyl-N-β-phenoxyethylaniline, N-cyanomethyl-N-β-phenoxyethylaniline, N-β-carbonamidoethyl-N-β-phenoxyethylaniline, N-β-benzoyloxyethyl-N-β-phenoxyethylaniline, N-β-phenylaminocarbonyloxyethyl-N-β-phenoxyethylaniline, N-β-(2,4,6-trichlorophenoxy)-ethyl-N-methylaniline, N-β-(α'-naphthoxy)-ethyl-N-methylaniline, N-β-(p-chlorobenzyloxy)-ethyl-N-methylaniline, N-β-(p-chlorobenzoyloxy)-ethyl-N-methylaniline, N-β-(2,4-dichlorophenoxy)-ethyl-N-methyl-3-chloroaniline, N-β-phenoxyethyl-N-n-butyl-3-chloroaniline, N-β-benzyloxyethyl-N-n-butyl-3-chloroaniline, N-β-(phenoxyethyl-N-methyl-3-chloroaniline, N-β-benzyloxyethyl-N-methyl-3-chloroaniline, N-β-benzoyloxyethyl-N-methyl-3-chloroaniline, N-β-(2,4,5-trichlorophenoxy)-ethyl-N-methyl-3-chloroaniline, N-β-benzoyloxyethyl-N-n-butyl-3-chloroaniline, N-β-(2,4-dichlorophenoxy)-ethyl-N-n-propyl-3-chloroaniline, N-β-phenoxyethyl-N-ethyl-2-methylaniline, N-β-phenoxyethyl-N-ethyl-2-methoxyaniline, N-β-phenoxyethyl-N-ethyl-3-acetylaminoaniline, N-β-cyclohexyloxy-ethyl-N-methylaniline, N-β-benzoyloxy-ethyl-N-methylaniline, N-β-(p-methoxybenzoyloxy)-ethyl-N-methylaniline, N-β-(p-methoxy-carbonylbenzoyloxy)-ethyl-N-methylaniline, N-β-phenoxy-ethyl-N-methylaniline, N-β-benzyloxy-ethyl-N-methylaniline, N-β-(β'-phenylethyloxy)-ethyl-N-methylaniline, N-β-(γ'-phenylpropyloxy)-ethyl-N-methylaniline, N-β-(β'-phenyloxyethyloxy)-ethyl-N-methylaniline, N-β-(p-chlorophenoxy)-ethyl-N-methylaniline, N-β-(p-chlorobenzyloxy)-ethyl-N-methylaniline, N-β-(o-chlorophenoxy)-ethyl-N-methylaniline, N-β-(p-methylphenoxy)-ethyl-N-methylaniline, N-β-(o-methylphenoxy)-ethyl-N-methylaniline, N-β-(p-ethylphenoxy)-ethyl-N-methylaniline, N-β-(o-ethylphenoxy)-ethyl-N-methylaniline, N-β-(m-methylphenoxy)-ethyl-N-methylaniline, N-β-(p-cyclohexylphenoxy)-ethyl-N-methylaniline, N-β-(β'-naphthoxy)-ethyl-N-methylaniline, N-β-(o-isopropyloxyphenoxy)-ethyl-N-methylaniline, N-β-(o,p-dichlorophenoxy)-ethyl-N-methylaniline, N-β-(p-phenylphenoxy)-ethyl-N-methylaniline, N-β-(o-benzylphenoxy)-ethyl-N-methylaniline, N-β-(p-benzylphenoxy)-ethyl-N-methylaniline, N-β-(p-tert.-butylphenoxy)-ethyl-N-methylaniline, N-β-phenylthioethyl-N-methylaniline, N-β-(p-methoxy-phenoxy)-ethyl-N-methylaniline, N-β-(o-isopropyl-phenoxy)-ethyl-N-methylaniline, N-β-(2,5-dichlorophenoxy)-ethyl-N-methylaniline, N-β-(2,4,5-trichlorophenoxy)-ethyl-N-methylaniline, N-β-cyclohexyloxy-ethyl-N-n-butylaniline, N-β-benzoyloxy-ethyl-N-n-butylaniline, N-β-(p-methoxybenzoyloxy)-ethyl-N-n-butylaniline, N-β-(p-methoxycarbonylbenzoyloxy)-ethyl-N-n-butylaniline, N-β-phenoxy-ethyl-N-n-butylaniline, N-β- benzyloxy-ethyl-N-n-butylaniline, N-β-(β'-phenylethyloxy)-ethyl-N-n-butylaniline, N-β-(γ'-phenylpropyloxy)-ethyl-N-n-butylaniline, N-β-(β'-phenyloxyethyloxy)-ethyl-N-n-butylaniline, N-β-(p-chlorophenoxy)-ethyl-N-n-butylaniline, N-β-(p-chlorobenzyloxy)-ethyl-N-n-butylaniline, N-β-(o-chlorophenoxy)-ethyl-N-n-butylaniline, N-β-(p-methylphenoxy)-ethyl-N-n-butylaniline, N-β-(o-methylphenoxy)-ethyl-N-n-butylaniline, N-β-(p-ethylphenoxy)-ethyl-N-n-butylaniline, N-β-(o-ethylphenoxy)-ethyl-N-n-butylaniline, N-β-(m-methylphenoxy)-ethyl-N-n-butylaniline, N-β-(p-cyclohexylphenoxy)-ethyl-N-n-butylaniline, N-β-(β'-naphthoxy)-ethyl-N-n-butylaniline, N-β-(o-isopropyloxyphenoxy)-ethyl-N-n-butylaniline, N-β-(o,p-dichlorophenoxy)-ethyl-N-n-butylaniline, N-β-(p-phenylphenoxy)-ethyl-N-n-butylaniline, N-β-(o-benzylphenoxy)-ethyl-N-n-butylaniline, N-β-(p-benzylphenoxy)-ethyl-N-n-butylaniline, N-β-(p-tert.-butylphenoxy)-ethyl-N-n-butylaniline, N-β-phenylthioethyl-N-n-butylaniline, N-β-(p-methoxy-phenoxy)-ethyl-N-n-butylaniline, N-β-(o-isopropyl-phenoxy)-ethyl-N-n-butylaniline, N-β-cyclohexyloxy-ethyl-N-ethyl-3-chloroaniline, N-β-benzoyloxy-ethyl-N-ethyl-3-chloroaniline, N-β-(p-methoxybenzoyloxy)-ethyl-N-ethyl-3-chloroaniline, N-β-(p-methoxycarbonylbenzoyloxy)-ethyl-N-ethyl-3-chloroaniline, N-β-phenoxyethyl-N-ethyl-3-chloroaniline, N-β-benzyloxy-ethyl-ethyl-N-ethyl-3-chloroaniline, N-β-(β'-phenylethyloxy)-ethyl-N-ethyl-3-chloroaniline, N-β-(γ'-phenylpropyloxy)-ethyl-N-ethyl-3-chloroaniline, N-β-(β'-phenyloxyethyloxy)-ethyl-N-ethyl-3-chloroaniline, N-β-(p-chlorophenoxy)-ethyl-N-ethyl-3-chloroaniline, N-β-(p-chlorobenzyloxy)-ethyl-N-ethyl-3-chloroaniline, N-β-(o-chlorophenoxy)-ethyl-N-ethyl-3-chloroaniline, N-β-(p-methylphenoxy)-ethyl-N-ethyl-3-chloroaniline, N-β-(o-methylphenoxy)-ethyl-N-ethyl-3-chloroaniline, N-β-(p-ethylphenoxy)-ethyl-N-ethyl-3-chloroaniline, N-β-(o-ethylphenoxy)-ethyl-N-ethyl-3-chloroaniline, N-β-(m-methylphenoxy)-ethyl-N-ethyl-3-chloroaniline, N-β-(p-cyclohexylphenoxy)-ethyl-N-ethyl-3-chloroaniline, N-β-(β'-naphthoxy)-ethyl-N-ethyl-3-chloroaniline, N-β-(o-isopropyloxyphenoxy)-ethyl-N-ethyl-3-chloroaniline, N-β-(o,p-dichlorophenoxy)-ethyl-N-ethyl-3-chloroaniline, N-β-(p-phenylphenoxy)-ethyl-N-ethyl-3-chloroaniline, N-β-(o-benzylphenoxy)-ethyl-N-ethyl-3-chloroaniline, N-β-(p-benzylphenoxy)-ethyl-N-ethyl-3-chloroaniline, N-β-(p-tert.-butylphenoxy)-ethyl-N-ethyl-3-chloroaniline, N-β-phenylthio-ethyl-N-ethyl-3-chloroaniline, N-β-(p-methoxy-phenoxy)-ethyl-N-ethyl-3-chloroaniline, N-β-(o-isopropyl-phenoxy)-ethyl-N-ethyl-3-chloroaniline, N-β-cyclohexyloxy-ethyl-N-ethyl-3-methoxyaniline, N-β-benzoyloxy-ethyl-N-ethyl-3-methoxyaniline, N-β-(p-methoxybenzoyloxy)-ethyl-N-ethyl-3-methoxyaniline, N-β-(p-methoxy-carbonylbenzoyloxy)-ethyl-N-ethyl-3-methoxyaniline, N-β-phenoxy-ethyl-N-ethyl-3-methoxyaniline, N-β-benzyloxyethyl-N-ethyl-3-methoxyaniline, N-β-(β'-phenylethyloxy)-ethyl-N-ethyl-3-methoxyaniline, N-β-(γ'-phenylpropyloxy)-ethyl-N-ethyl-3-methoxyaniline, N-β-(β'-phenyloxyethyloxy)-ethyl-N-ethyl-3-methoxyaniline, N-β-(p-chlorophenoxy)-ethyl-N-ethyl-3-methoxyaniline, N-β-(p-chlorobenzyloxy)-ethyl-N-ethyl-3-methoxyaniline, N-β-(o-chlorophenoxy)-ethyl-N-ethyl-3-methoxyaniline, N-β-(p-methylphenoxy)-ethyl-N-ethyl-3-methoxyaniline, N-β-(o-methylphenoxy)-ethyl-N-ethyl-3-methoxyaniline, N-β-(m-methylphenoxy)-ethyl-N-ethyl-3-methoxyaniline, N-β-(p-cyclohexylphenoxy)-ethyl-N-ethyl-3-methoxyaniline, N-β-(β'-naphthoxy)-ethyl-N-ethyl-3-methoxyaniline, N-β-(o-isopropyloxyphenoxy)-ethyl-N-ethyl-3-methoxyaniline, N-β-(o,p-dichlorophenoxy)-ethyl-N-ethyl-3-methoxyaniline, N-β-(p-phenylphenoxy)-ethyl-N-ethyl-3-methoxyaniline, N-β-(o-benzylphenoxy)-ethyl-N-ethyl-3-methoxyaniline, N-β-(p-benzylphenoxy)-ethyl-N-ethyl-3-methoxyaniline, N-β-(p-tert.-butylphenoxy)-ethyl-N-ethyl-3-methoxyaniline, N-β-phenylthio-ethyl-N-ethyl-3-methoxyaniline, N-β-(p-methoxy-phenoxy)-ethyl-N-ethyl-3-methoxyaniline, N-β-(o-isopropylphenoxy)-ethyl-N-ethyl-3-methoxyaniline, N-β-cyclohexyloxy-ethyl-N-ethyl-m-toluidine, N-β-benzoyloxy-ethyl-N-ethyl-m-toluidine, N-β-(p-methoxybenzoyloxy)-ethyl-N-ethyl-m-toluidine, N-β-(p-methoxy-carbonylbenzoyloxy)-ethyl-N-ethyl-m-toluidine, N-β-phenoxy-ethyl-N-ethyl-m-toluidine, N-β-benzyloxy-ethyl-N-ethyl-m-toluidine, N-β-(β'-phenylethyloxy)-ethyl-N-ethyl-m-toluidine, N-β-(γ'-phenylpropyloxy)-ethyl-N-ethyl-m-toluidine, N-β-(β'-phenyloxyethyloxy)-ethyl-N-ethyl-m-toluidine, N-β-(p-chlorophenoxy)-ethyl-N-ethyl-m-toluidine, N-β-(p-chlorobenzyloxy)-ethyl-N-ethyl-m-toluidine, N-β-(o-chlorophenoxy)-ethyl-N-ethyl-m-toluidine, N-β-(p-methylphenoxy)-ethyl-N-ethyl-m-toluidine, N-β-(o-methylphenoxy)-ethyl-N-ethyl-m-toluidine, N-β-(p-ethylphenoxy)-ethyl-N-ethyl-m-toluidine, N-β-(o-ethylphenoxy)-ethyl-N-ethyl-m-toluidine, N-β-(m-methylphenoxy)-ethyl-N-ethyl-m-toluidine, N-β-(p-cyclohexylphenoxy)-ethyl-N-ethyl-m-toluidine, N-β-(β'-naphthoxy)-ethyl-N-ethyl-m-toluidine, N-β-(o-isopropyloxyphenoxy)-ethyl-N-ethyl-m-toluidine, N-β-(o,p-dichlorophenoxy)-ethyl-N-ethyl-m-toluidine, N-β-(p-phenylphenoxy)-ethyl-N-ethyl-m-toluidine, N-β-(o-benzylphenoxy)-ethyl-N-ethyl-m-toluidine, N-β-(p-benzylphenoxy)-ethyl-N-ethyl-m-toluidine, N-β-(p-tert.-butylphenoxy)-ethyl-N-ethyl-m-toluidine, N-β-phenylthio-N-ethyl-m-toluidine, N-β-(p-methoxy-phenoxy)-ethyl-N-ethyl-m-toluidine, N-β-(o-isopropylphenoxy)-ethyl-N-ethyl-m-toluidine, N-β-(m-chlorophenoxy)-ethyl-N-n-butylaniline, N-β-(2,5-dichlorophenoxy)-ethyl-N-n-butylaniline, N-β-(2,4,5-trichlorophenoxy)-ethyl-N-n-butylaniline, N-β-(2,6-dichlorophenoxy)-ethyl-N-n-butylaniline, N-β-(2,4,6-trichlorophenoxy)-ethyl-N-n-butylaniline, N-β-(pentachlorophenoxy)-ethyl-N-n-butylaniline, N-β-(phenylaminocarbonyloxy)-ethyl-N-n-butylaniline, N-β-(p-chlorobenzyloxy)-ethyl-N-n-butylaniline, N-β-(p-chlorobenzoyloxy)-ethyl-N-n-butylaniline, N-β-(α'-naphthoxy)-ethyl-N-n-butylaniline, N-β-(p-chlorobenzyloxy)-ethyl-N-ethyl-3-chloroaniline, N-β-(p-chlorobenzoyloxy)-ethyl-N-ethyl-3-chloroaniline, N-β-(2,5-dichlorophenoxy)-ethyl-N-ethyl-3-chloroaniline, N-β-(m-chlorophenoxy)-ethyl-N-ethyl-3-chloroaniline, N-β-(α'-naphthoxy)-ethyl-N-ethyl-3-chloroaniline, N-β-(p-chlorobenzyloxy)-ethyl-N-ethyl-3-chloroaniline, N-β-(p-chlorobenzoyloxy)-ethyl-N-ethyl-3-chloroaniline, N-β-(m-chlorophenoxy)-ethyl-N-ethyl-3-chloroaniline, N-β-(2,5-dichlorophenoxy)-ethyl-N-ethyl-3-chloroaniline, N-β-(2,4,5-trichlorophenoxy)-ethyl-N-ethyl-3-chloroaniline, N-β-(2,5-dichlorophenoxy)-ethyl-N-ethyl-3-chloroaniline, N-β-(m-chlorophenoxy)-ethyl-N-ethyl-3-chloroaniline, N-β-(α'-naphthoxy)-ethyl-N-ethyl-3-chloroaniline, N-β-phenoxyethyl-N-ethyl-2-acetylaminoaniline, N-β-phenoxyethyl-N-ethyl-3-ethoxyaniline, N-β-phenoxyethyl-N-ethyl-2-phenoxyaniline, N-β-phenoxyethyl-N-ethyl-2-benzyloxyaniline, N-β-phenoxyethyl-N-ethyl-3-benzyloxyaniline, N-β-(o-phenylphenoxy)-ethyl-N-ethyl-3-chloroaniline, N-β-(o-phenylphenoxy)-ethyl-N-methylaniline, N-β-(o-phenylphenoxy)-ethyl-N-butylaniline, N-β-(2,4,5-trichlorophenoxy)-ethyl-N-ethyl-m-toluidine, N-β-phenoxyethyl-N-ethyl-2-methyl-5-chloroaniline, N-β-benzoyloxy-ethyl-N-ethyl-3-trifluoromethylaniline, N-β-phenoxyethyl-N-ethyl-2,3-dimethylaniline, N-β-phenoxyethyl-N-ethyl-α-naphthylamine, N-β-benzyloxyethyl-N-ethyl-α-naphthylamine, N-β-benzoyloxyethyl-N-ethyl-α-naphthylamine, N-β-phenoxyethyl-N-ethyl-2-methoxy-5-chloroaniline, N-β-phenoxyethyl-N-ethyl-2-phenoxy-5-chloroaniline, N-β-phenoxyethyl-N-ethyl-2-methyl-5-methoxyaniline, N-β-phenoxyethyl-N-ethyl-2,5-dimethoxyaniline, N-β-phenoxyethyl-N-ethyl-2-methoxy-5-ethylsulphonylaniline, N-γ-benzyloxypropylaniline, N-δ-benzyloxy-n-butylaniline, N-γ-(β'-phenoxyethyloxy)-propylaniline and N-δ-(β'-phenoxyethyloxy)-butylaniline.

The new dyestuffs are suitable for dyeing, printing bulk dyeing of materials containing acid groups, above all of products which consist completely or predominantly of polymerised unsaturated nitriles such as acrylonitrile and vinylidene cyanide or of acid-modified polyesters or of acid-modified polyamides. They are distinguished by a high affinity to the fibre. They are furthermore suitable for the remaining known applications of cationic dyestuffs, such as dyeing and printing of cellulose acetate, coir, jute, sisal and silk and of tannin-treated cotton and paper, for the preparation of ball pen pastes and rubber-stamp inks and for use in flexographic printing.

example, the tertiary butyl group or the dodecyl group, or if the anion X⁻ is the anion of a monobasic organic acid with 4–30 carbon atoms.

EXAMPLE 1

18 g of 2-amino-6-methoxybenzthiazole are dissolved in a mixture of 120 ml of glacial acetic acid and 60 ml of water. 29 ml of 48% strength sulphuric acid are then added and the amount of nitrosylsulphuric acid corresponding to 7 g of sodium nitrite is then added dropwise at −5° C. After stirring for a further hour at this temperature, 1 g of amidosulphonic acid is added, the mixture is stirred for a further 10 minutes and a solution of 28.5 g of N-ethyl-N-β-(β-phenoxyethyloxy)-ethyl-aniline in a mixture of 100 ml of propionic acid, 50 ml of glacial acetic acid and 10 g of 78% strength sulphuric acid is then introduced at −5° C. The mixture is stirred for a further hour at −10° C and diluted with water to approx. 600 ml and the product is filtered off. The azo dyestuff is suspended in water and the suspension is neutralised with sodium hydroxide solution. The product is then again filtered off, washed with water and dried in vacuo. The resulting black-violet powder is stirred into 150 ml of chloroform and 25 g of dimethyl sulphate are added dropwise at the boiling point of the chloroform. The mixture is then stirred for a further 90 minutes under reflux cooling and 900 ml of boiling water are then introduced. Hereupon, the chloroform distils off.

40 g of sodium chloride are added to the resulting solution at 50° C, the mixture is cooled and the dyestuff which has crystallised out is filtered off and dried in vacuo. It has the formula

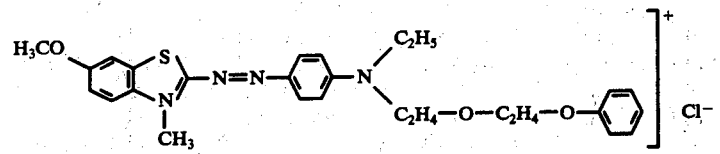

The dyeings and prints on the first-mentioned materials, especially on polyacrylonitrile, are distinguished by their very high level of fastness, above all by very good fastness to light, wet processing, rubbing, decatising, sublimation and perspiration.

The dyestuffs can be used individually or as mixtures.

The dyestuffs according to the invention, and their mixtures, are very suitable for dyeing shaped articles of polymers or copolymers of acrylonitrile or asymmetrical dicyanoethylene, and of acid-modified aromatic polyesters, in chlorinated hydrocarbons as the dyebath, especially if they carry substituents which assist the solubility in chlorinated hydrocarbons, such as, for and dyes polyacrylonitrile fibres in a blue colour shade of outstanding fastness properties.

The dyestuff can also be prepared by carrying out the quaternisation with p-toluenesulphonic acid methyl ester or with methyl idodide instead of with dimethyl sulphate.

Valuable dyestuffs are also obtained when 2-amino-6-methoxybenzthiazole is coupled and analogously with the anilines shown below, and the azo dyestuff, which has been freed from acid, is methylated with dimethyl sulphate. The colour shade obtained when the dyestuffs are used to dye polyacrylonitrile is also shown.

| Coupling component | Colour shade on polyacrylonitrile |
|---|---|
| N-β-Cyclohexyloxy-ethyl-N-ethylaniline | blue |
| N-β-Benzoyloxy-ethyl-N-ethylaniline | " |
| N-β-(p-Methoxybenzoyloxy)-ethyl-N-ethylaniline | " |
| N-β-(p-Methoxy-carbonylbenzoyloxy)-ethyl-N-ethylaniline | " |
| N-β-Phenoxy-ethyl-N-ethylaniline | " |
| N-β-Benzyloxy-ethyl-N-ethylaniline | " |
| N-β-(β'-Phenylethyloxy)-ethyl-N-ethylaniline | " |
| N-β-(γ'-Phenylpropyloxy)-ethyl-N-ethylaniline | " |
| N-β-(p-Chlorophenoxy)-ethyl-N-ethylaniline | " |
| N-β-(p-Chlorobenzyloxy)-ethyl-N-ethylaniline | " |
| N-β-(o-Chlorophenoxy)-ethyl-N-ethylaniline | " |
| N-β-(p-Methylphenoxy)-ethyl-N-ethylaniline | " |
| N-β-(o-Methylphenoxy)-ethyl-N-ethylaniline | " |
| N-β-(p-Ethylphenoxy)-ethyl-N-ethylaniline | " |
| N-β-(o-Ethylphenoxy)-ethyl-N-ethylaniline | " |

-continued

| Coupling component | Colour shade on polyacrylonitrile |
|---|---|
| N-β-(m-Methylphenoxy)-ethyl-N-ethylaniline | " |
| N-β-(p-Cyclohexylphenoxy)-ethyl-N-ethylaniline | " |
| N-β-(β'-Naphthoxy)-ethyl-N-ethylaniline | " |
| N-β-(o-Isopropyloxyphenoxy)-ethyl-N-ethylaniline | " |
| N-β-(o,p-Dichlorophenoxy)-ethyl-N-ethylaniline | " |
| N-β-(p-Phenylphenoxy)-ethyl-N-ethylaniline | |
| Mixture of N-β-(o-benzylphenoxy)-ethyl-N-ethylaniline and N-β-(p-benzylphenoxy)-ethyl-N-ethylaniline | " |
| N-β-(p-tert.-Butylphenoxy)-ethyl-N-ethylaniline | " |
| N-β-Phenylthio-ethyl-N-ethylaniline | |
| N-β-(p-Methoxy-phenoxy)-ethyl-N-ethylaniline | " |
| N-β-(o-Isopropyl-phenoxy)-ethyl-N-ethylaniline | " |
| N-β-(1,2,3,4-Tetrahydronaphth-(6)-oxy)-ethyl-N-ethylaniline | |
| N-β-(1,2,3,4-Tetrahydronaphth-(1)-oxy)-ethyl-N-ethylaniline | " |
| N-γ-Phenoxypropyl-N-ethylaniline | " |
| N-δ-Phenoxybutyl-N-ethylaniline | " |
| N-β-(p-tert.-Butylphenylthio)-ethyl-N-ethylaniline | " |
| N-β-Pentachlorophenylthio-ethyl-N-ethylaniline | |
| N-β-(3,5-Dimethylphenoxy)-ethyl-N-ethylaniline | " |
| N-β-(3,5-Dimethyl-4-chlorophenoxy)-ethyl-N-ethylaniline | " |
| N-β-[p-(2-Phenylisopropyl)-phenoxy]-ethyl-N-ethylaniline | " |
| N-β-(m-Chlorophenoxy)-ethyl-N-ethylaniline | |
| N-β-(2,5-Dichlorophenoxy)-ethyl-N-ethylaniline | " |
| N-β-(2,4,5-Trichlorophenoxy)-ethyl-N-ethylaniline | " |
| N-β-(2,6-Dichlorophenoxy)-ethyl-N-ethylaniline | " |
| N-β-(2,4,6-Trichlorophenoxy)-ethyl-N-ethylaniline | " |
| N-β-(Pentachlorophenoxy)-ethyl-N-ethylaniline | |
| N-β-(p-Chlorophenylthio)-ethyl-N-ethylaniline | " |
| N-β-(2-Chloro-6-methylphenoxy)-ethyl-N-ethylaniline | " |
| N-β-(2-Methyl-5-chlorophenoxy)-ethyl-N-ethylaniline | " |
| N-β-(2-Methyl-4-chlorophenoxy)-ethyl-N-ethylaniline | " |
| N-β-(2-Methyl-3-chlorophenoxy)-ethyl-N-ethylaniline | |
| N-β-(2-Chloro-5-methylphenoxy)-ethyl-N-ethylaniline | " |
| N-β-(3-Methyl-4-chlorophenoxy)-ethyl-N-ethylaniline | |
| N-β-(2,4,6-Trichloro-3-methylphenoxy)-ethyl-N-ethylaniline | |
| N-β-(p-Methylphenylthio)-ethyl-N-ethylaniline | " |
| N-β-(2,3-Dimethylphenoxy)-ethyl-N-ethylaniline | " |
| N-β-(3,4-Dimethylphenoxy)-ethyl-N-ethylaniline | " |
| N-β-(2,6-Dimethylphenoxy)-ethyl-N-ethylaniline | " |
| N-β-(2,4-Dimethylphenoxy)-ethyl-N-ethylaniline | " |
| N-β-(2,5-Dimethylphenoxy)-ethyl-N-ethylaniline | |
| N-β-(3-Methyl-5-ethylphenoxy)-ethyl-N-ethylaniline | " |
| N-β-(2,3,5-Trimethylphenoxy)-ethyl-N-ethylaniline | " |
| N-β-(o-sec.-butylphenoxy)-ethyl-N-ethylaniline | |
| N-β-(2-Isopropyl-5-methylphenoxy)-ethyl-N-ethylaniline | " |
| N-β-(3-Methyl-5-isopropylphenoxy)-ethyl-N-ethylaniline | " |
| N-β-[p-(1,1,3,3-Tetramethylbutyl)-phenoxy]-ethyl-N-ethylaniline | " |
| N-β-Nonylphenoxyethyl-N-ethylaniline | " |
| N-β-Dodecylphenoxyethyl-N-ethylaniline | " |
| N-β-(2,6-Diisopropylphenoxy)-ethyl-N-ethylaniline | " |
| N-β-(2-Cyclohexylphenoxy)-ethyl-N-ethylaniline | " |
| N-β-(α'-Naphthoxy)-ethyl-N-ethylaniline | |
| N-β-(o-phenylphenoxy)-ethyl-N-ethylaniline | " |
| N-β-(m-phenylphenoxy)-ethyl-N-ethylaniline | " |
| N-β-(o-Ethoxy-phenoxy)-ethyl-N-ethylaniline | " |
| N-β-(m-Methoxy-phenoxy)-ethyl-N-ethylaniline | " |
| N-β-(p-Phenylsulphonyl-phenoxy)-ethyl-N-ethylaniline | |
| N-β-(3-Methyl-4-methylthiophenoxy)-ethyl-N-ethylaniline | " |
| N-β-(p-Methylcyclohexyloxy)-ethyl-N-ethylaniline | " |
| N-β-(o-Methylcyclohexyloxy)-ethyl-N-ethylaniline | " |
| N-β-(m-Methylcyclohexyloxy)-ethyl-N-ethylaniline | |
| N-β-(Decahydronaphth-(2)-oxy)-ethyl-N-ethylaniline | " |
| N-β-Menthyl-ethyl-N-ethylaniline | " |
| N-β-Borneyl-ethyl-N-ethylaniline | |
| N-β-(o-Chlorobenzyloxy)-ethyl-N-ethylaniline | " |
| N-β-(p-Methylbenzyloxy)-ethyl-N-ethylaniline | " |
| N-β-(p-Methoxybenzyloxy)-ethyl-N-ethylaniline | " |
| N-β-(o-Methylbenzyloxy)-ethyl-N-ethylaniline | |
| N-β-(m-Chlorobenzyloxy)-ethyl-N-ethylaniline | " |
| N-β-(m-Methylbenzyloxy)-ethyl-N-ethylaniline | " |
| N-β-(p-Chlorobenzoyloxy)-ethyl-N-ethylaniline | |
| N-β-(p-Methylbenzoyloxy)-ethyl-N-ethylaniline | " |
| N-β-(Chlorobenzoyloxy)-ethyl-N-ethylaniline | " |
| N-β-(3,4-Dichlorobenzoyloxy)-ethyl-N-ethylaniline | |
| N-β-(2-Methylbenzoyloxy)-ethyl-N-ethylaniline | " |
| N-β-(p-Methoxybenzoyloxy)-ethyl-N-ethylaniline | " |
| N-β-(m-Chlorobenzoyloxy)-ethyl-N-ethylaniline | " |
| N-β-(2,5-Dichlorobenzoyloxy)-ethyl-N-ethylaniline | " |
| N-β-(2,4-Dichlorobenzoyloxy)-ethyl-N-ethylaniline | " |
| N-β-(2-Bromobenzoyloxy)-ethyl-N-ethylaniline | " |
| N-β-(m-Methylbenzoyloxy)-ethyl-N-ethylaniline | " |
| N-β-(p-tert.-butylbenzoyloxy)-ethyl-N-ethylaniline | |
| N-β-(Naphth(2)oyloxy)-ethyl-N-ethylaniline | " |
| N-β-(Naphth(1)oyloxy)-ethyl-N-ethylaniline | " |
| N-β-(p-Phenylbenzoyloxy)-ethyl-N-ethylaniline | " |
| N-β-(2-Methoxybenzoyloxy)-ethyl-N-ethylaniline | " |
| N-β-(3-Methoxybenzoyloxy)-ethyl-N-ethylaniline | " |
| N-β-(p-Methoxycarbonylphenoxy)-ethyl-N-ethylaniline | |
| N-β-(p-Ethylthio-o-chlorobenzoyloxy)-ethyl-N-ethylaniline | " |
| N-β-(2,6-Dichlorobenzyloxy)-ethyl-N-ethylaniline | " |
| N-β-(3,4-Dichlorobenzyloxy)-ethyl-N-ethylaniline | " |
| N-β-(1,2,3,4-Tetrahydronaphth(6)-oxymethoxy)-ethyl-N-ethylaniline | " |

-continued

| Coupling component | Colour shade on polyacrylonitrile |
|---|---|
| N-β-(Benzthiazol-(2)-ylthio)-ethyl-N-ethylaniline | " |
| Mixture of N-β-phenoxy-n-butyl-N-ethylaniline and N-(1-phenoxy)-sec.-butyl-N-ethylaniline | " |
| Mixture of N-β-benzyloxy-n-butyl-N-ethylaniline and N-(1-benzyloxy)-sec.-butyl-N-ethylaniline | " |
| Mixture of N-β-benzoyloxy-n-butyl-N-ethylaniline and N-(1-benzoyloxy)-sec.-butyl-N-ethylaniline | " |
| Mixture of N-β-phenylaminocarbonyloxy-n-butyl-N-ethylaniline and N-(1-phenylaminocarbonyloxy)-sec.-butyl-N-ethylaniline | " |
| Mixture of N-β-phenoxy-n-propyl-N-ethylaniline and N-(1-phenoxy)-i-propyl-N-ethylaniline | " |
| Mixture of N-β-benzyloxy-n-propyl-N-ethylaniline and N-(1-benzyloxy)-i-propyl-N-ethylaniline | " |
| Mixture of N-β-benzoyloxy-n-propyl-N-ethylaniline and N-(1-benzoyloxy)-i-propyl-N-ethylaniline | " |
| N,N-bis-(β-Phenoxyethyl)-aniline | " |
| N,N-bis-(β-Benzoyloxyethyl)-aniline | " |
| N,N-bis-(β-Phenylaminocarbonyloxyethyl)-aniline | " |
| N,N-bis-(β-Benzyloxyethyl)-aniline | " |
| N-(β-Benzoyloxy-γ-chloro)-propyl-N-ethylaniline | " |
| N-Cyclohexyl-N β-phenoxyethylaniline | " |
| N-Benzyl-N-β-phenoxyethylaniline | " |
| N-n-Propyl-N-β-phenoxy-ethylaniline | " |
| N-n-Propyl-N-β-benzyloxyethylaniline | " |
| N-n-Propyl-N-β-benzoyloxyethylaniline | " |
| N-Benzyl-N-β-benzyloxyethylaniline | " |
| N-Benzyl-N-β-benzoyloxyethylaniline | " |
| N-β-Chloroethyl-N-β-phenoxyethylaniline | " |
| N-β-Hydroxyethyl-N-β-phenoxyethylaniline | " |
| N-β-Cyanoethyl-N-β-phenoxyethylaniline | " |
| N-β-Acetoxyethyl-N-β-phenoxyethylaniline | " |
| N-β-Methoxyethyl-N-β-phenoxyethylaniline | " |
| N-β-Butoxyethyl-N-β-phenoxyethylaniline | " |
| N-β-Hydroxy-n-butyl-N-β-phenoxyethylaniline | " |
| N-β-Hydroxy-n-propyl-N-β-phenoxyethylaniline | " |
| N-β-Cyanomethyl-N-β-phenoxyethylaniline | " |
| N-β-Carbonamidoethyl-N-β-phenoxyethylaniline | " |
| N-β-Benzoyloxyethyl-N-β-phenoxyethylaniline | " |
| N-β-Phenylaminocarbonyloxyethyl-N-β-phenoxyethylaniline | " |
| N-β-(2,4,6-Trichlorophenoxy)-ethyl-N-methylaniline | " |
| N-β-(α'-Naphthoxy)-ethyl-N-methylaniline | " |
| N-β-(p-Chlorobenzyloxy)-ethyl-N-methylaniline | " |
| N-β-(p-Chlorobenzoyloxy)-ethyl-N-methylaniline | " |
| N-β-(2,4-Dichlorophenoxy)-ethyl-N-methyl-3-chloroaniline | " |
| N-β-Phenoxyethyl-N-n-butyl-3-chloroaniline | " |
| N-β-Benzyloxyethyl-N-n-butyl-3-chloroaniline | " |
| N-β-Phenoxyethyl-N-methyl-3-chloroaniline | " |
| N-β-Benzyloxyethyl-N-methyl-3-chloroaniline | " |
| N-β-Benzoyloxyethyl-N-methyl-3-chloroaniline | " |
| N-β-(2,4,5-Trichlorophenoxy)-ethyl-N-methyl-3-chloroaniline | " |
| N-β-Benzoyloxyethyl-N-n-butyl-3-chloroaniline | " |
| N-β-(2,4-Dichlorophenoxy)-ethyl-N-n-propyl-3-chloroaniline | " |
| N-β-Phenoxyethyl-N-ethyl-2-methylaniline | " |
| N-β-Phenoxyethyl-N-ethyl-2-methoxyaniline | " |
| N-β-Phenoxyethyl-N-ethyl-3-acetylaminoaniline | " |
| N-β-Cyclohexyloxy-ethyl-N-methylaniline | " |
| N-β-Benzoyloxy-ethyl-N-methylaniline | " |
| N-β-(p-Methoxybenzoyloxy)-ethyl-N-methylaniline | " |
| N-β-(p-Methoxy-carbonylbenzoyloxy)-ethyl-N-methylaniline | " |
| N-β-Phenoxy-ethyl-N-methylaniline | " |
| N-β-Benzyloxy-ethyl-N-methylaniline | " |
| N-β-(β'-Phenylethyloxy)-ethyl-N-methylaniline | " |
| N-β-(γ'-Phenylpropyloxy)-ethyl-N-methylaniline | " |
| N-β-(β'-Phenyloxyethyloxy)-ethyl-N-methylaniline | " |
| N-β-(p-Chlorophenoxy)-ethyl-N-methylaniline | " |
| N-β-(p-Chlorobenzyloxy)-ethyl-N-methylaniline | " |
| N-β-(o-Chlorophenoxy)-ethyl-N-methylaniline | " |
| N-β-(p-Methylphenoxy)-ethyl-N-methylaniline | " |
| N-β-(o-Methylphenoxy)-ethyl-N-methylaniline | " |
| N-β-(p-Ethylphenoxy)-ethyl-N-methylaniline | " |
| N-β-(o-Ethylphenoxy)-ethyl-N-methylaniline | " |
| N-β-(m-Methylphenoxy)-ethyl-N-methylaniline | " |
| N-β-(p-Cyclohexylphenoxy)-ethyl-N-methylaniline | " |
| N-β-(β'-Naphthoxy)-ethyl-N-methylaniline | " |
| N-β-(o-Isopropyloxyphenoxy)-ethyl-N-methylaniline | " |
| N-β-(o,p-Dichlorophenoxy)-ethyl-N-methylaniline | " |
| N-β-(p-Phenylphenoxy)-ethyl-N-methylaniline | " |
| Mixture of N-β-(o-benzylphenoxy)-ethyl-N-methylaniline and N-β-(p-benzylphenoxy)-ethyl-N-methylaniline | " |
| N-β-(p-tert.-butylphenoxy)-ethyl-N-methylaniline | " |
| N-β-Phenylthio-ethyl-N-methylaniline | " |
| N-β-(p-Methoxy-phenoxy)-ethyl-N-methylaniline | " |
| N-β-(o-Isopropyl-phenoxy)-ethyl-N-methylaniline | " |
| N-β-(2,5-Dichlorophenoxy)-ethyl-N-methylaniline | " |
| N-β-(2,4,5-Trichlorophenoxy)-ethyl-N-methylaniline | " |
| N-β-Cyclohexyloxy-ethyl-N-n-butylaniline | " |
| N-β-Benzoyloxy-ethyl-N-n-butylaniline | " |
| N-β-(p-Methoxybenzoyloxy)-ethyl-N-n-butylaniline | " |
| N-β-(p-Methoxy-carbonylbenzoyloxy)-ethyl-N-n-butylaniline | " |
| N-β-Phenoxy-ethyl-N-n-butylaniline | " |
| N-β-Benzyloxy-ethyl-N-n-butylaniline | " |
| N-β-(β'-Phenylethyloxy)-ethyl-N-n-butylaniline | " |

-continued

| Coupling component | Colour shade on polyacrylonitrile |
|---|---|
| N-β-(γ'-Phenylpropyloxy)-ethyl-N-n-butylaniline | " |
| N-β-(β'-Phenyloxyethyloxy)-ethyl-N-n-butylaniline | " |
| N-β-(p-Chlorophenoxy)-ethyl-N-n-butylaniline | " |
| N-β-(p-Chlorobenzyloxy)-ethyl-N-n-butylaniline | " |
| N-β-(o-Chlorophenoxy)-ethyl-N-n-butylaniline | " |
| N-β-(p-Methylphenoxy)-ethyl-N-n-butylaniline | " |
| N-β-(o-Methylphenoxy)-ethyl-N-n-butylaniline | " |
| N-β-(p-Ethylphenoxy)-ethyl-N-n-butylaniline | " |
| N-β-(o-Ethylphenoxy)-ethyl-N-n-butylaniline | " |
| N-β-(m-Methylphenoxy)-ethyl-N-n-butylaniline | " |
| N-β-(p-Cyclohexylphenoxy)-ethyl-N-n-butylaniline | " |
| N-β-(β'-Naphthoxy)-ethyl-N-n-butylaniline | " |
| N-β-(o-Isopropyloxyphenoxy)-ethyl-N-n-butylaniline | " |
| N-β-(o,p-Dichlorophenoxy)-ethyl-N-n-butylaniline | " |
| N-β-(p-Phenylphenoxy)-ethyl-N-n-butylaniline | " |
| Mixture of N-β-(o-benzylphenoxy)-ethyl-N-n-butylaniline and N-β-(p-benzylphenoxy)-ethyl-N-n-butylaniline | " |
| N-β-(p-tert.-Butylphenoxy)-ethyl-N-n-butylaniline | " |
| N-β-Phenylthio-ethyl-N-n-butylaniline | " |
| N-β-(p-Methoxy-phenoxy)-ethyl-N-n-butylaniline | " |
| N-β-(o-Isopropyl-phenoxy)-ethyl-N-n-butylaniline | " |
| N-β-Cyclohexyloxy-ethyl-N-ethyl-3-chloroaniline | " |
| N-β-Benzoyloxy-ethyl-N-ethyl-3-chloroaniline | " |
| N-β-(p-Methoxybenzoyloxy)-ethyl-N-ethyl-3-chloroaniline | " |
| N-β-(p-Methoxy-carbonylbenzoyloxy)-ethyl-N-ethyl-3-chloroaniline | " |
| N-β-Phenoxy-ethyl-N-ethyl-3-chloroaniline | " |
| N-β-Benzyloxy-ethyl-N-ethyl-3-chloroaniline | " |
| N-β-(β'-Phenylethyloxy)-ethyl-N-ethyl-3-chloroaniline | " |
| N-β-(γ'-Phenylpropyloxy)-ethyl-N-ethyl-3-chloroaniline | " |
| N-β-(β'-Phenyloxyethyloxy)-ethyl-N-ethyl-3-chloroaniline | " |
| N-β-(p-Chlorophenoxy)-ethyl-N-ethyl-3-chloroaniline | " |
| N-β-(p-Chlorobenzyloxy)-ethyl-N-ethyl-3-chloroaniline | " |
| N-β-(o-Chlorophenoxy)-ethyl-N-ethyl-3-chloroaniline | " |
| N-β-(p-Methylphenoxy)-ethyl-N-ethyl-3-chloroaniline | " |
| N-β-(o-Methylphenoxy)-ethyl-N-ethyl-3-chloroaniline | " |
| N-β-(p-Ethylphenoxy)-ethyl-N-ethyl-3-chloroaniline | " |
| N-β-(o-Ethylphenoxy)-ethyl-N-ethyl-3-chloroaniline | " |
| N-β-(m-Methylphenoxy)-ethyl-N-ethyl-3-chloroaniline | " |
| N-β-(p-Cyclohexylphenoxy)-ethyl-N-ethyl-3-chloroaniline | " |
| N-β-(β'-Naphthoxy)-ethyl-N-ethyl-3-chloroaniline | " |
| N-β-(o-Isopropyloxyphenoxy)-ethyl-N-ethyl-3-chloroaniline | " |
| N-β-(o,p-Dichlorophenoxy)-ethyl-N-ethyl-3-chloroaniline | " |
| N-β-(p-Phenylphenoxy)-ethyl-N-ethyl-3-chloroaniline | " |
| Mixture of N-β-(o-benzylphenoxy)-ethyl-N-ethyl-3-chloroaniline and N-β-(p-benzylphenoxy)-ethyl-N-ethyl-3-chloroaniline | " |
| N-β-(p-tert.-Butylphenoxy)-ethyl-N-ethyl-3-chloroaniline | " |
| N-β-Phenylthio-ethyl-N-ethyl-3-chloroaniline | " |
| N-β-(p-Methoxy-phenoxy)-ethyl-N-ethyl-3-chloroaniline | " |
| N-β-(o-Isopropyl-phenoxy)-ethyl-N-ethyl-3-chloroaniline | " |
| N-β-Cyclohexyloxy-ethyl-N-ethyl-3-methoxyaniline | reddish-tinged blue |
| N-β-Benzoyloxy-ethyl-N-ethyl-3-methoxyaniline | " |
| N-β-(p-Methoxybenzoyloxy)-N-ethyl-3-methoxyaniline | " |
| N-β-(p-Methoxy-carbonylbenzoyloxy)-N-ethyl-3-methoxyaniline | " |
| N-β-Phenoxy-ethyl-N-ethyl-3-methoxyaniline | " |
| N-β-Benzyloxy-ethyl-N-ethyl-3-methoxyaniline | " |
| N-β-(β'-Phenylethyloxy)-ethyl-N-ethyl-3-methoxyaniline | " |
| N-β-(γ'-Phenylpropyloxy)-ethyl-N-ethyl-3-methoxyaniline | " |
| N-β-(β'-Phenyloxyethyloxy)-ethyl-N-ethyl-3-methoxyaniline | " |
| N-β-(p-Chlorophenoxy)-ethyl-N-ethyl-3-methoxyaniline | " |
| N-β-(p-Chlorobenzyloxy)-ethyl-N-ethyl-3-methoxyaniline | " |
| N-β-(o-Chlorophenoxy)-ethyl-N-ethyl-3-methoxyaniline | " |
| N-β-(p-Methylphenoxy)-ethyl-N-ethyl-3-methoxyaniline | " |
| N-β-(o-Methylphenoxy)-ethyl-N-ethyl-3-methoxyaniline | " |
| N-β-(p-Ethylphenoxy)-ethyl-N-ethyl-3-methoxyaniline | " |
| N-β-(o-Ethylphenoxy)-ethyl-N-ethyl-3-methoxyaniline | " |
| N-β-(m-Methylphenoxy)-ethyl-N-ethyl-3-methoxyaniline | " |
| N-β-(p-Chlorohexylphenoxy)-ethyl-N-ethyl-3-methoxyaniline | " |
| N-β-(β'-Naphthoxy)-ethyl-N-ethyl-3-methoxyaniline | " |
| N-β-(o-Isopropyloxyphenoxy)-ethyl-N-ethyl-3-methoxyaniline | " |
| N-β-(o,p-Dichlorophenoxy)-ethyl-N-ethyl-3-methoxyaniline | " |
| N-β-(p-Phenylphenoxy)-ethyl-N-ethyl-3-methoxyaniline | " |
| Mixture of N-β-(o-benzylphenoxy)-ethyl-N-ethyl-3-methoxyaniline and N-β-(p-benzylphenoxy)-ethyl-N-ethyl-3-methoxyaniline | " |
| N-β-(p-tert.-Butylphenoxy)-ethyl-N-ethyl-3-methoxyaniline | " |
| N-β-Phenylthio-ethyl-N-ethyl-3-methoxyaniline | " |
| N-β-(p-Methoxy-phenoxy)-ethyl-N-ethyl-3-methoxyaniline | " |
| N-β-(o-Isopropyl-phenoxy)-ethyl-N-ethyl-3-methoxyaniline | " |
| N-β-Cyclohexyloxy-ethyl-N-ethyl-m-toluidine | blue |
| N-β-Benzoyloxy-ethyl-N-ethyl-m-toluidine | " |
| N-β-(p-Methoxybenzoyloxy)-ethyl-N-ethyl-m-toluidine | " |
| N-β-(p-Methoxy-carbonylbenzoyloxy-ethyl-N-ethyl-m-toluidine | " |
| N-β-Phenoxy-ethyl-N-ethyl-m-toluidine | " |
| N-β-Benzyloxy-ethyl-N-ethyl-m-toluidine | " |
| N-β-(β'-Phenylethyloxy)-ethyl-N-ethyl-m-toluidine | " |
| N-β-(γ'-Phenylpropyloxy)-ethyl-N-ethyl-m-toluidine | " |
| N-β-(β'-Phenyloxyethyloxy)-ethyl-N-ethyl-m-toluidine | " |
| N-β-(p-Chlorophenoxy)-ethyl-N-ethyl-m-toluidine | " |
| N-β-(p-Chlorobenzyloxy)-ethyl-N-ethyl-m-toluidine | " |
| N-β-(o-Chlorophenoxy)-ethyl-N-ethyl-m-toluidine | " |
| N-β-(p-Methylphenoxy)-ethyl-N-ethyl-m-toluidine | " |
| N-β-(o-Methylphenoxy)-ethyl-N-ethyl-m-toluidine | " |
| N-β-(p-Ethylphenoxy)-ethyl-N-ethyl-m-toluidine | " |

-continued

| Coupling component | Colour shade on polyacrylonitrile |
|---|---|
| N-β-(o-Ethylphenoxy)-ethyl-N-ethyl-m-toluidine | " |
| N-β-(m-Methylphenoxy)-ethyl-N-ethyl-m-toluidine | " |
| N-β-(p-Cyclohexylphenoxy)-ethyl-N-ethyl-m-toluidine | " |
| N-β-(β'-Naphthoxy)-ethyl-N-ethyl-m-toluidine | " |
| N-β-(o-Isopropyloxyphenoxy)-ethyl-N-ethyl-m-toluidine | " |
| N-β-(o,p-Dichlorophenoxy)-ethyl-N-ethyl-m-toluidine | " |
| N-β-(p-Phenylphenoxy)-ethyl-N-ethyl-m-toluidine | " |
| Mixture of N-β-(o-benzylphenoxy)-ethyl-N-ethyl-m-toluidine and N-β-(p-benzylphenoxy)-ethyl-N-ethyl-m-toluidine | " |
| N-β-(p-tert.-Butylphenoxy)-ethyl-N-ethyl-m-toluidine | " |
| N-β-Phenylthio-ethyl-N-ethyl-m-toluidine | " |
| N-β-(p-Methoxy-phenoxy)-ethyl-N-ethyl-m-toluidine | " |
| N-β-(o-Isopropyl-phenoxy)-ethyl-N-ethyl-m-toluidine | " |
| N-β-(m-Chlorophenoxy)-ethyl-N-n-butylaniline | " |
| N-β-(2,5-Dichlorophenoxy)-ethyl-N-n-butylaniline | " |
| N-β-(2,4,5-Trichlorophenoxy)-ethyl-N-n-butylaniline | " |
| N-β-(2,6-Dichlorophenoxy)-ethyl-N-n-butylaniline | " |
| N-β-(2,4,6-Trichlorophenoxy)-ethyl-N-n-butylaniline | " |
| N-β-(Pentachlorophenoxy)-ethyl-N-n-butylaniline | " |
| N-β-(Phenylaminocarbonyloxy)-ethyl-N-n-butylaniline | " |
| N-β-(p-Chlorobenzyloxy)-ethyl-N-n-butylaniline | " |
| N-β-(p-Chlorobenzoyloxy)-ethyl-N-n-butylaniline | " |
| N-β-(α'-Naphthoxy)-ethyl-N-n-butylaniline | " |
| N-β-(p-Chlorobenzyloxy)-ethyl-N-ethyl-3-chloroaniline | " |
| N-β-(p-Chlorobenzoyloxy)-ethyl-N-ethyl-3-chloroaniline | " |
| N-β-(2,5-Dichlorophenoxy)-ethyl-N-ethyl-3-chloroaniline | " |
| N-β-(m-Chlorophenoxy)-ethyl-N-ethyl-3-chloroaniline | " |
| N-β-(α'-Naphthoxy)-ethyl-N-ethyl-3-chloroaniline | " |
| N-β-(p-Chlorobenzyloxy)-ethyl-N-ethyl-3-chloroaniline | " |
| N-β-(p-Chlorobenzoyloxy)-ethyl-N-ethyl-3-chloroaniline | " |
| N-β-(m-Chlorophenoxy)-ethyl-N-ethyl-3-chloroaniline | " |
| N-β-(2,5-Dichlorophenoxy)-ethyl-N-ethyl-3-chloroaniline | " |
| N-β-(2,4,5-Trichlorophenoxy)-ethyl-N-ethyl-3-chloroaniline | " |
| N-β-(2,5-Dichlorophenoxy)-ethyl-N-ethyl-3-chloroaniline | " |
| N-β-(m-Chlorophenoxy)-ethyl-N-ethyl-3-chloroaniline | " |
| N-β-(α'-Naphthoxy)-ethyl-N-ethyl-3-chloroaniline | " |
| N-β-Phenoxyethyl-N-ethyl-2-acetylaminoaniline | " |
| N-β-Phenoxyethyl-N-ethyl-3-ethoxyaniline | reddish-tinged blue |
| N-β-Phenoxyethyl-N-ethyl-2-phenoxyaniline | blue |
| N-β-Phenoxyethyl-N-ethyl-2-benzyloxyaniline | " |
| N-β-Phenoxyethyl-N-ethyl-3-benzyloxyaniline | " |
| N-β-(o-Phenylphenoxy)-ethyl-N-ethyl-3-chloroaniline | " |
| N-β-(o-Phenylphenoxy)-ethyl-N-methylaniline | " |
| N-β-(o-Phenylphenoxy)-ethyl-N-butylaniline | " |
| N-β-(2,4,5-Trichlorophenoxy)-ethyl-N-ethyl-m-toluidine | " |
| N-β-Phenoxyethyl-N-ethyl-2-methyl-5-chloroaniline | " |
| N-β-Benzoyloxyethyl-N-ethyl-3-trifluoromethylaniline | " |
| N-β-Phenoxyethyl-N-ethyl-2,3-dimethylaniline | " |
| N-β-Phenoxyethyl-N-ethyl-α-naphthylamine | " |
| N-β-Benzyloxyethyl-N-ethyl-α-naphthylamine | " |
| N-β-Benzoyloxyethyl-N-ethyl-α-naphthylamine | " |
| N-β-Phenoxyethyl-N-ethyl-2-methoxy-5-chloroaniline | " |
| N-β-Phenoxyethyl-N-ethyl-2-phenoxy-5-chloroaniline | " |
| N-β-Phenoxyethyl-N-ethyl-2-methyl-5-methoxyaniline | " |
| N-β-Phenoxyethyl-N-ethyl-2,5-dimethoxyaniline | " |
| N-β-Phenoxyethyl-N-ethyl-2-methoxy-5-ethylsulphonylaniline | " |
| N-γ-Benzyloxypropylaniline | " |
| N-δ-Benzyloxy-n-butylaniline | " |
| N-γ-(β'-Phenoxyethyloxy)-propylaniline | " |
| N-δ-(β'-Phenoxyethyloxy)-butylaniline | " |

If in Example 1, instead of 6-methoxy-2-aminobenzthiazole the equivalent amount of 2-aminobenzthiazole, 6-ethoxy-2-aminobenzthiazole, 6-benzoylamino-2-aminobenzthiazole, 6-acetylamino-2-aminobenzthiazole, 6-(α-ethyl-capronylamino)-2-aminobenzthiazole, 6-methoxy-4-methyl-2-aminobenzthiazole, 5,6-dimethoxy-2-aminobenzthiazole, a mixture of 5-methyl-6-methoxy- and 7-methyl-6-methoxy-2-aminobenzthiazole, 6-propoxy-2-aminobenzthiazole, 6-butoxy-2-aminobenzthiazole, 6-benzyloxy-2-aminobenzthiazole, 6-tert.-butyl-2-aminobenzthiazole, 6-methyl-2-aminobenzthiazole, 6-benzyl-2-aminobenzthiazole, 4,6,7-trimethyl-2-aminobenzthiazole or 6-ethyl-2-aminobenzthiazole is employed for the diazotisation and is coupled to N-ethyl-N-β-(β'-phenoxyethyloxy)-ethylaniline in the manner described, analogous working up and, if appropriate, conversion of the acid salt of the azo dyestuff into the neutral dyestuff and subsequent methylation in the manner described, again yields valuable blue dyestuffs.

If, in this procedure, the following 2-aminobenzthiazoles and coupling components are used, dyestuffs which dye Dralon in the colour shade which is also shown are obtained.

| 2-Aminobenzthiazole | Coupling component | Colour shade on polyacrylonitrile |
|---|---|---|
| 6-Ethoxy- | N-ethyl-N-β-phenoxyethylaniline | blue |
| " | N-ethyl-N-β-benzyloxyethylaniline | " |
| " | N-ethyl-N-β-benzoyloxyethylaniline | " |
| " | N-ethyl-N-β-(o-methylphenoxy)-ethylaniline | " |
| " | N-ethyl-N-β-(o-chlorophenoxy)-ethylaniline | " |
| " | N-ethyl-N-β-(p-chlorophenoxy)-ethylaniline | " |
| " | N-ethyl-N-β-(p-methoxyphenoxy)-ethylaniline | " |

-continued

| 2-Aminobenzthiazole | Coupling component | Colour shade on polyacrylonitrile |
|---|---|---|
| " | N-ethyl-N-β-(β-phenylethyloxy)-ethylaniline | " |
| " | N-ethyl-N-β-(γ'-phenylpropyloxy)-ethylaniline | " |
| " | N-ethyl-N-β-(p-methylphenoxy)-ethylaniline | " |
| " | N-ethyl-N-β-(p-cyclohexylphenoxy)-ethylaniline | " |
| " | N-butyl-N-β-phenoxyethylaniline | " |
| " | N-butyl-N-β-(o-chlorophenoxy)-ethylaniline | " |
| " | N-methyl-N-β-(o-chlorophenoxy)-ethylaniline | " |
| " | N-butyl-N-β-(p-methoxyphenoxy)-ethylaniline | " |
| 6-Methyl- | N-ethyl-N-β-phenoxyethylaniline | " |
| " | N-ethyl-N-β-benzyloxyethylaniline | " |
| " | N-ethyl-N-β-benzoyloxyethylaniline | " |
| " | N-ethyl-N-β-(o-methylphenoxy)-ethylaniline | " |
| " | N-ethyl-N-β-(o-chlorophenoxy)-ethylaniline | " |
| " | N-ethyl-N-β-(p-chlorophenoxy)-ethylaniline | " |
| " | N-ethyl-N-β-(p-methoxyphenoxy)-ethylaniline | " |
| " | N-ethyl-N-β-(β'-phenylethyloxy)-ethylaniline | " |
| " | N-ethyl-N-β-(β'-phenoxyethyloxy)-ethylaniline | " |
| " | N-ethyl-N-β-(γ'-phenylpropyloxy)-ethylaniline | " |
| " | N-ethyl-N-β-(p-methylphenoxy)-ethylaniline | " |
| " | N-ethyl-N-β-(p-cyclohexylphenoxy)-ethylaniline | " |
| " | N-butyl-N-β-phenoxyethylaniline | " |
| " | N-butyl-N-β-(o-chlorophenoxy)-ethylaniline | " |
| " | N-butyl-N-β-(p-methoxyphenoxy)-ethylaniline | " |
| " | N-methyl-N-β-(o-chlorophenoxy)-ethylaniline | " |

In addition to the examples summarised above, further valuable blue dyestuffs are obtained if, when preparing the tabulated dyestuffs produced from 2-amino-6-methoxybenzthiazole (pages 31 to 50), the following are used instead of 2-amino-6-methoxybenzthiazole: 2-amino-6-ethoxybenzthiazole, 2-amino-6-methoxy-4-methyl-benzthiazole, 2-amino-5,6-dimethoxybenzthiazole, 2-amino-6-benzoylamino-benzthiazole, 2-amino-6-acetylamino-benzthiazole, 2-amino-6-(α-ethyl-capronylamino)-benzthiazole, 2-amino-6-propoxy-benzthiazole, 2-amino-6-butoxy-benzthiazole, 2-amino-6-benzyloxy-benzthiazole, 2-amino-6-tert.-butyl-benzthiazole, 2-amino-6-methyl-benzthiazole, 2-amino-6-benzyl-benzthiazole, 2-amino-4,6,7-trimethyl-benzthiazole, 2-amino-6-ethyl-benzthiazole, 2-aminobenzthiazole or a mixture of 5-methyl-6-methoxy-2-aminobenzthiazole and 7-methyl-6-methoxy-2-aminobenzthiazole.

EXAMPLE 2

If the procedure in Example 1 is followed and then, instead of dimethyl sulphate, the equivalent amount of diethyl sulphate is employed, it being advisable at the same time to extend the duration of the alkylation to 12 hours, the dyestuff of the formula

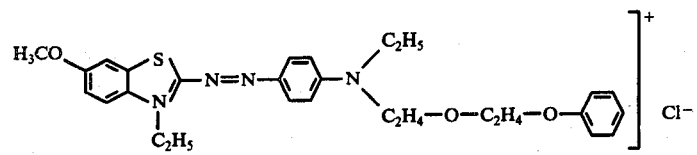

is obtained. This dyes polyacrylonitrile in a blue colour shade of good fastness properties.

Comparably good results are obtained if diethyl sulphate is used instead of dimethyl sulphate in the preparation of the dyestuffs mentioned in the tables accompanying Example 1.

EXAMPLE 3

10 g of the azo dyestuff described in Example 1, which has not been reacted with dimethyl sulphate, are stirred with 30 ml of acetonitrile and 30 ml of n-butyl bromide, 1 g of magnesium oxide is added and the mixture is heated to 80°–85° C for 20 hours. The solvents are then distilled off in a water pump vacuum. The distillation residue is dissolved in hot water and the solution is clarified with 3 g of active charcoal. The dyestuff is then precipitated with sodium chloride, isolated from the solution and dried in vacuo.

The reaction product has the formula

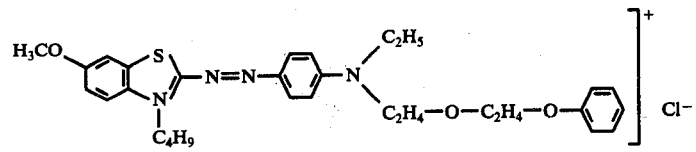

It dyes Dralon in a blue colour shade.

EXAMPLE 4

10 g of the azo dyestuff described in Example 1, which has not been reacted with dimethyl sulphate, are stirred in 50 ml of glacial acetic acid at 50° C. Ethylene oxide is then passed in and the temperature is slowly raised to 80° C. As soon as the quaternisation, which can easily be followed in a thin layer chromatogram, is complete, the solution is stirred into 450 ml of 20% strength sodium chloride solution, the mixture is stirred for some minutes longer, and the dyestuff is then isolated from the solution. It is dried in vacuo and obtained in quantitative yield. The product has the formula:

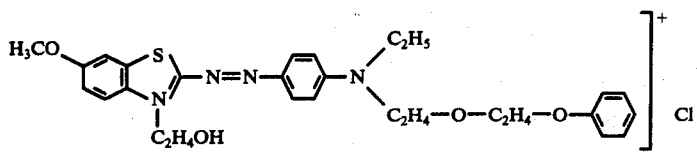

It dyes polyacrylonitrile in a blue colour shade.

EXAMPLE 5

If the procedure indicated in Example 4 is followed and instead of ethylene oxide 10 g of 1,2-butylene oxide are added, analogous working up gives the dyestuff of the formula

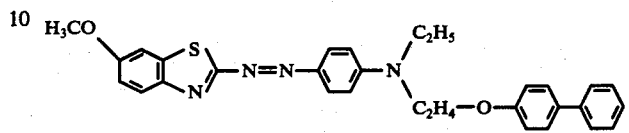

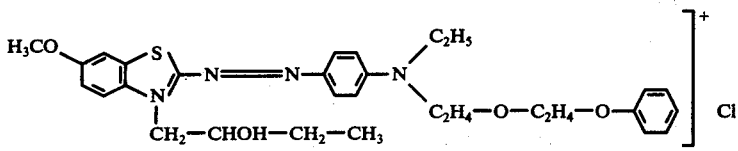

which also dyes Dralon in a blue of good fastness properties.

If, using an analogous procedure, the azo dyestuffs from the following 2-aminobenzthiazoles and coupling components are reacted with the epoxides indicated, dyestuffs are obtained, the colour shade of which, on Dralon, is also listed.

| 2-Amino-benzthiazole | Coupling component | Quaternised with | Colour shade on Dralon |
|---|---|---|---|
| " | N-ethyl-N-β-phenoxyethylaniline | ethylene oxide | " |
| " | " | butylene oxide | " |
| " | N-ethyl-N-β-benzyloxyethylaniline | ethylene oxide | " |
| " | N-ethyl-N-β-benzoyloxyethylaniline | " | " |
| 6-Methoxy | N-ethyl-N-β-(o-chlorophenoxy)-ethylaniline | " | " |
| " | " | butylene oxide | " |
| " | N-ethyl-N-β-(p-chlorophenoxy)-ethylaniline | ethylene oxide | " |
| " | N-ethyl-N-β-(p-methoxyphenoxy)-ethylaniline | " | " |
| " | N-ethyl-N-β-(o-methylphenoxy)-ethylaniline | " | " |
| " | N-ethyl-N-β-(p-methylphenoxy)-ethylaniline | " | " |
| " | N-ethyl-N-β-(β'-phenoxyethyloxy)-ethylaniline | γ-phenoxypropylene oxide | " |

In addition to the examples listed above, further blue dyestuffs are obtained if, when preparing the dyestuffs mentioned in Example 1 and in the tables accompanying Example 1, the quaternisation is not carried out with dimethyl sulphate as described there, and instead is carried out, as previously described in Examples 4 and 5, with ethylene oxide, propylene oxide, butylene oxide, γ-phenoxypropylene oxide, γ-allyloxypropylene oxide, styrene oxide, γ-methoxypropylene oxide, γ-ethoxypropylene oxide, γ-propoxypropylene oxide, epichlorohydrin or other epoxides.

EXAMPLE 6

27 g of the dyestuff of the formula obtained by coupling 2-amino-6-methoxy-benzthiazole with N-ethyl-N-β-(p-phenylphenoxy)-ethylaniline, the methylation product of this dyestuff having already been mentioned in the table accompanying Example 1, are stirred with 35.5 g of acrylic acid amide in 115 g of glacial acetic acid, 5 g of 36% strength hydrochloric acid are added and the solution is heated to 90° C until non-quaternised azo dyestuff is no longer detectable in the thin layer chromatogram. The resulting mixture is stirred into 500 parts of 20% strength sodium chloride solution and the dyestuff is separated from the aqueous phase.

The dyestuff has the formula

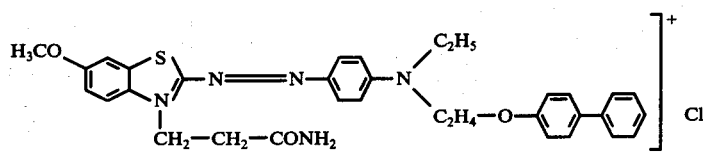

and dyes Dralon in a blue colour shade.

Blue dyestuffs are also obtained if, in preparing the dyestuffs listed in Example 1 and in the tables accompanying Example 1, quaternisation is not carried out with dimethyl sulphate, as indicated in Example 1, but with acrylic acid amide, as described in Example 6.

EXAMPLE 7

A polyacrylonitrile fabric is printed with a printing paste which has been prepared as follows: 30 parts by weight of the dyestuff described in Example 1, 50 parts by weight of thiodiethylene glycol, 30 parts by weight of cyclohexanol and 30 parts by weight of 30% strength acetic acid are covered with 330 parts by weight of hot water and the resulting solution is added to 500 parts by weight of crystal gum (gum arabic as a thickener). Finally, 30 parts by weight of zinc nitrate solution are also added. The resulting print is dried, steamed for 30 minutes and then rinsed.

A blue print of very good fastness properties is obtained.

EXAMPLE 8

Acid-modified polyglycol terephthalate fibres are introduced, using a liquor ratio of 1:40, into an aqueous bath at 20° C, which contains, per liter, 3 to 10 g of sodium sulphate, 0.1 to 1 g of oleyl polyglycol ether (50 mols of ethylene oxide), 0–15 g of dimethylbenzyldodecylammonium chloride and 0.15 g of the dyestuff of the formula

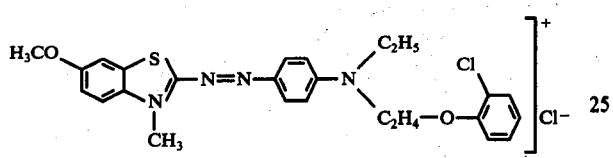

and which has been adjusted to pH 4 to 5 with acetic acid. The bath is heated to 100° C over the course of 30 minutes and is kept at this temperature for 60 minutes. The fibres are then rinsed and dried.

A blue dyeing of very good fastness properties is obtained. Its outstanding fastness to light should be singled out particularly.

Comparably good results are obtained with the other dyestuffs mentioned in Example 1, in the tables accompanying Example 1 and in Examples 2 to 6.

EXAMPLE 9

Polyacrylonitrile fibres are introduced, using a liquor ratio of 1:40, into an aqueous bath at 40° C, which contains, per liter, 0.75 g of 30% strength acetic acid, 0.38 g of sodium acetate and 0.15 g of the dyestuff described in Example 1. The bath is heated to the boil over the course of 20–30 minutes and is kept at this temperature for 30–60 minutes. After rinsing and drying, a blue dyeing with very good fastness properties is obtained.

EXAMPLE 10

A stock solution is prepared from 15 parts by weight of the dyestuff mentioned in Example 1, 15 parts by weight of polyacrylonitrile and 70 parts by weight of dimethylformamide, and is added to a customary spinning solution of polyacrylonitrile which is spun in the known manner. A blue colouration of very good fastness properties is obtained.

EXAMPLE 11

Acid-modified synthetic polyamide fibres are introduced, using a liquor ratio of 1:40, into an aqueous bath at 40° C which contains, per liter, 10 g of sodium acetate, 1 to 5 g of oleyl polyglycol ether (50 mols of ethylene oxide) and 0.3 g of the dyestuff described in Example 1 and which has been adjusted to pH 4–5 with acetic acid. The bath is heated to 98° C over the course of 30 minutes and is kept at this temperature. The fibres are then rinsed and dried. A blue dyeing is obtained.

We claim:
1. Dyestuff of the formula:

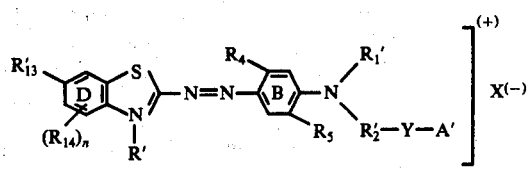

wherein
R' represents $C_1$-$C_6$-alkyl, halo-$C_1$-$C_6$-alkyl, hydroxy-$C_1$-$C_6$-alkyl, cyano-$C_1$-$C_6$-alkyl, acetoxy-$C_1$-$C_6$-alkyl, $C_1$-$C_4$-alkoxycarbonyl-$C_1$-$C_6$-alkyl, carbonyl-$C_1$-$C_6$-alkyl, aminocarbonyl-$C_1$-$C_6$-alkyl, $C_2$-$C_7$-alkenyl, benzyl, phenylethyl, or

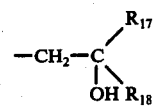

wherein
$R_{17}$ denotes hydrogen or methyl and
$R_{18}$ denotes methyl, ethyl, chloromethyl, methoxymethyl, ethoxymethyl, propoxymethyl, butoxymethyl, allyloxymethyl, phenoxymethyl, or phenyl;
$R_1'$ represents $C_1$-$C_6$-alkyl, $C_2$-$C_7$-alkenyl, cyclopentyl, cyclohexyl, benzyl, β-phenylethyl, $C_1$-$C_6$-alkylcyclopentyl, $C_1$-$C_6$-alkylcyclohexyl, $C_1$-$C_6$-alkylbenzyl, $C_1$-$C_6$-alkyl-β-phenylethyl or $C_1$-$C_6$-alkyl substituted by halogen, hydroxyl, $C_1$-$C_4$-alkoxy, phenoxy, cyano, acetoxy, hydroxycarbonyl, $C_1$-$C_4$-alkoxycarbonyl, $C_1$-$C_4$-alkoxycarbonyloxy, aminocarbonyl, $C_1$-$C_4$-alkylsulphonylamino, or $C_1$-$C_4$-alkylsulphonyl-$C_1$-$C_4$-alkylamino;
$R_2$ represents

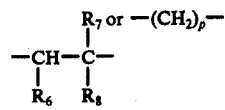

$R_6$ denotes hydrogen, methyl, ethyl, methoxymethyl, ethoxymethyl, propoxymethyl, butoxymethyl, allyloxymethyl, phenyl, or phenoxymethyl;
$R_7$ denotes hydrogen, methyl, ethyl, butoxymethyl, methoxymethyl, ethoxymethyl, propoxymethyl, allyloxymethyl, phenyl, phenoxymethyl, or —Y—A';
$R_8$ denotes hydrogen or methyl;
p denotes the numbers 1 - 6;
Y represents oxygen or sulphur;
$R_4$ represents hydrogen, halogen, $C_1$-$C_6$-alkyl, halo-$C_1$-$C_6$-alkyl, $C_1$-$C_4$-alkoxy, $C_1$-$C_4$-alkylcarbonylamino, $C_1$-$C_4$-alkylsulphonylamino, phenylcarbonylamino, phenylsulphonylamino, $C_1$-$C_4$-alkylcarbonyloxy, phenylcarbonyloxy, benzyloxy, β-phenylethyloxy, or either of the last two mentioned radicals substituted in the phenyl ring by $C_1$-$C_6$-alkyl, cyano, phenyloxy, naphthyloxy, $C_1$-$C_6$-alkylphenyloxy, $C_1$-$C_6$-alkylnaphthyloxy, halophenyloxy, or halonaphthyloxy;
$R_4$, in addition, when joined together with B represents a fused naphthalene ring or a fused tetralin ring;

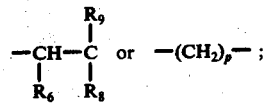

R$_5$ represents hydrogen, C$_1$-C$_6$-alkyl, C$_1$-C$_4$-alkoxy, C$_1$-C$_4$-alkylcarbonylamino or C$_1$-C$_4$-alkylsulphonylamino, phenylcarbonylamino, phenylsulphonylamino, C$_1$-C$_4$-alkylcarbonyloxy, phenylcarbonyloxy, benzyloxy, β-phenylethyloxy, or either of the last two mentioned radicals substituted in the phenyl ring by C$_1$-C$_6$-alkyl, phenyloxy, naphthyloxy, C$_1$-C$_6$-alkylphenyloxy, C$_1$-C$_6$-alkylnaphthyloxy, halophenoxy, or halonaphthyloxy;

R$_5$, in addition, when joined together with B represent a fused naphthalene ring or a fused tetralin ring;

R$_{13}'$ represents hydrogen, C$_1$-C$_6$-alkyl, C$_1$-C$_4$-alkoxy, cyclopentyl, cyclohexyl, benzyl, β-phenylethyl, C$_1$-C$_6$-alkylcyclopentyl, C$_1$-C$_6$-alkylcyclohexyl, C$_1$-C$_6$-alkylbenzyl, C$_1$-C$_6$-alkyl-β-phenylethyl, phenyloxy, naphthyloxy, C$_1$-C$_6$-alkylphenyloxy, C$_1$-C$_6$-alkylnaphthyloxy, halophenyloxy, halonaphthyloxy, benzyloxy, β-phenylethyl, C$_1$-C$_4$-alkylcarbonylamino, C$_1$-C$_4$-alkylsulphonylamino, phenylcarbonylamino, phenylsulphonylamino, a fused benzene ring, or a fused tetrahydrobenzene ring, either of which is fused in the 4,5-position or 5,6-position of D;

R$_{14}$ represents C$_1$-C$_6$-alkyl, C$_1$-C$_4$-alkoxy, phenoxy, benzyloxy, benzyl, trifluoromethyl, halogen, C$_1$-C$_4$-alkylcarbonylamino, C$_1$-C$_4$-alkylsulphonylamino, phenylcarbonylamino, phenylsulphonylamino, a fused benzene ring or a fused tetrahydrobenzene ring either of which is fused in the 6,7-position of D;

A' is a member of a group consisting of cyclohexyl, naphthyl, phenyl, or phenyl substituted by chloro, methyl, ethyl, isopropyl, sec. butyl, tert. butyl, tetramethylbutyl, nonyl, dodecyl, phenyl, benzyl, cyclohexyl, phenyl-isopropyl, methoxy, ethoxy, isopropoxy, phenylsulfonyl or methylthio;

n represents the numbers 0, 1, 2, or 3; and

X$^{(-)}$ represents an anion.

2. Dyestuff of the formula

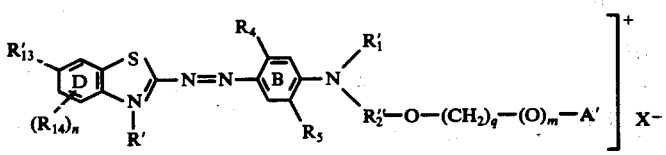

wherein

R', R$_1'$, R$_4$, R$_5$, R$_6$, R$_8$, R$_{13}'$, R$_{14}$, n, p, and X$^-$ have the same meaning as in claim 1;

R$_2''$ represents $$-CH-C-\underset{R_6\ R_8}{\overset{R_9}{|\ |}}\ \text{or}\ -(CH_2)_p-\ ;$$

R$_9$ represents hydrogen, methyl, ethyl, methoxymethyl, ethoxymethyl, propoxymethyl, butoxymethyl, allyloxymethyl, phenyl, phenoxymethyl, or —O—(CH$_2$)$_q$—(O)$_m$—A';

q represents the numbers 1-4;

m represents the numbers 0 or 1; and

A' represents phenyl or phenyl substituted by chloro or methyl.

3. Dyestuff according to claim 1, in which
R$_{13}'$ represents C$_1$-C$_4$-alkoxy and
R$_{14}$ represents methyl, ethyl, methoxy, ethoxy, chlorine, bromine, fluorine, trifluoromethyl, phenoxy or benzyloxy.

4. Dyestuff according to claim 1 in which R$_{13}'$ represents methoxy or ethoxy,
R' represents methyl or ethyl,
R$_5$ represents hydrogen,
R$_4$ represents hydrogen, methoxy, chlorine or methyl,
p represents the number 2,
n represents the number 0,
y represents oxygen.

5. Dyestuff according to claim 2, in which
R$_{13}'$ represents C$_1$-C$_4$-alkoxy and
R$_{14}$ represents methyl, ethyl, methoxy, ethoxy, chlorine, bromine, fluorine, trifluoromethyl, phenoxy or benzyloxy.

6. Dyestuff according to claim 2 in which
R$_{13}'$ represents methoxy or ethoxy,
R' represents methyl or ethyl,
R$_5$ represents hydrogen,
R$_4$ represents hydrogen, methoxy, chlorine or methyl,
q represents the numbers from 1-3,
n represents the number 0,
p represents the number 2,
m represents the number 0.

7. Dyestuff according to claim 2 in which
R$_{13}'$ represents methoxy or ethoxy,
R' represents methyl or ethyl,
R$_5$ represents hydrogen,
R$_4$ represents hydrogen, methoxy, chlorine or methyl,
q represents the number 2,
m represents the number 1.

* * * * *